(12) United States Patent
Dudar

(10) Patent No.: US 10,544,031 B2
(45) Date of Patent: Jan. 28, 2020

(54) SYSTEMS AND METHODS FOR DETECTION OF VEHICLE MISFUELING

(71) Applicant: Ford Global Technologies, LLC, Dearborn, MI (US)

(72) Inventor: Aed M. Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 505 days.

(21) Appl. No.: 15/289,791

(22) Filed: Oct. 10, 2016

(65) Prior Publication Data
US 2018/0099859 A1   Apr. 12, 2018

(51) Int. Cl.
*B67D 7/34* (2010.01)
*B60K 15/03* (2006.01)

(52) U.S. Cl.
CPC .............. *B67D 7/342* (2013.01); *B60K 15/03* (2013.01); *B60K 2015/03361* (2013.01); *B60K 2015/03368* (2013.01)

(58) Field of Classification Search
CPC .... B67D 7/342; B67D 7/34; B60K 15/03519; B60K 15/03504; B60K 2015/03514; B60K 2015/0321; B60K 2015/03576; B60K 2015/03; B60K 2015/03368; B60K 2015/03361; B60Y 2400/306
See application file for complete search history.

(56) References Cited

U.S. PATENT DOCUMENTS

| | | | |
|---|---|---|---|
| 2003/0209280 A1* | 11/2003 | Zerangue, Sr. | ........ B60K 15/04 141/4 |
| 2012/0152210 A1 | 6/2012 | Reddy et al. | |
| 2014/0297071 A1 | 10/2014 | Dudar et al. | |
| 2016/0061802 A1 | 3/2016 | Criel et al. | |
| 2018/0370351 A1* | 12/2018 | Vulkan | ............ B60K 15/03519 |

FOREIGN PATENT DOCUMENTS

| | | | | |
|---|---|---|---|---|
| EP | 0246684 A1 * | 11/1987 | ............ | B67D 7/342 |
| EP | 2993340 A1 | 3/2016 | | |

\* cited by examiner

*Primary Examiner* — Timothy L Maust
(74) *Attorney, Agent, or Firm* — Geoffrey Brumbaugh; McCoy Russell LLP

(57) ABSTRACT

Methods and systems are provided for identifying misfueling of a vehicle fuel tank with a fuel that is not of a correct type for the vehicle being refueled. In one example, and method may include routing fuel vapors from a vehicle fuel tank to a fuel vapor storage canister during a refueling operation, and responsive to an indication of misfueling, where the indication of misfueling includes a monitored pressure in the fuel tank below a misfueling pressure threshold, and where the misfueling pressure threshold is adjusted as a function of expected pressure in the tank during refueling, actively terminating the refueling event. In this way, addition of an incorrect fuel type to a vehicle fuel tank may be indicated prior to completion of refueling, which may thus alert a vehicle operator of the misfueling, and which may prevent further complications arising from operating the vehicle with an incorrect fuel type.

19 Claims, 11 Drawing Sheets

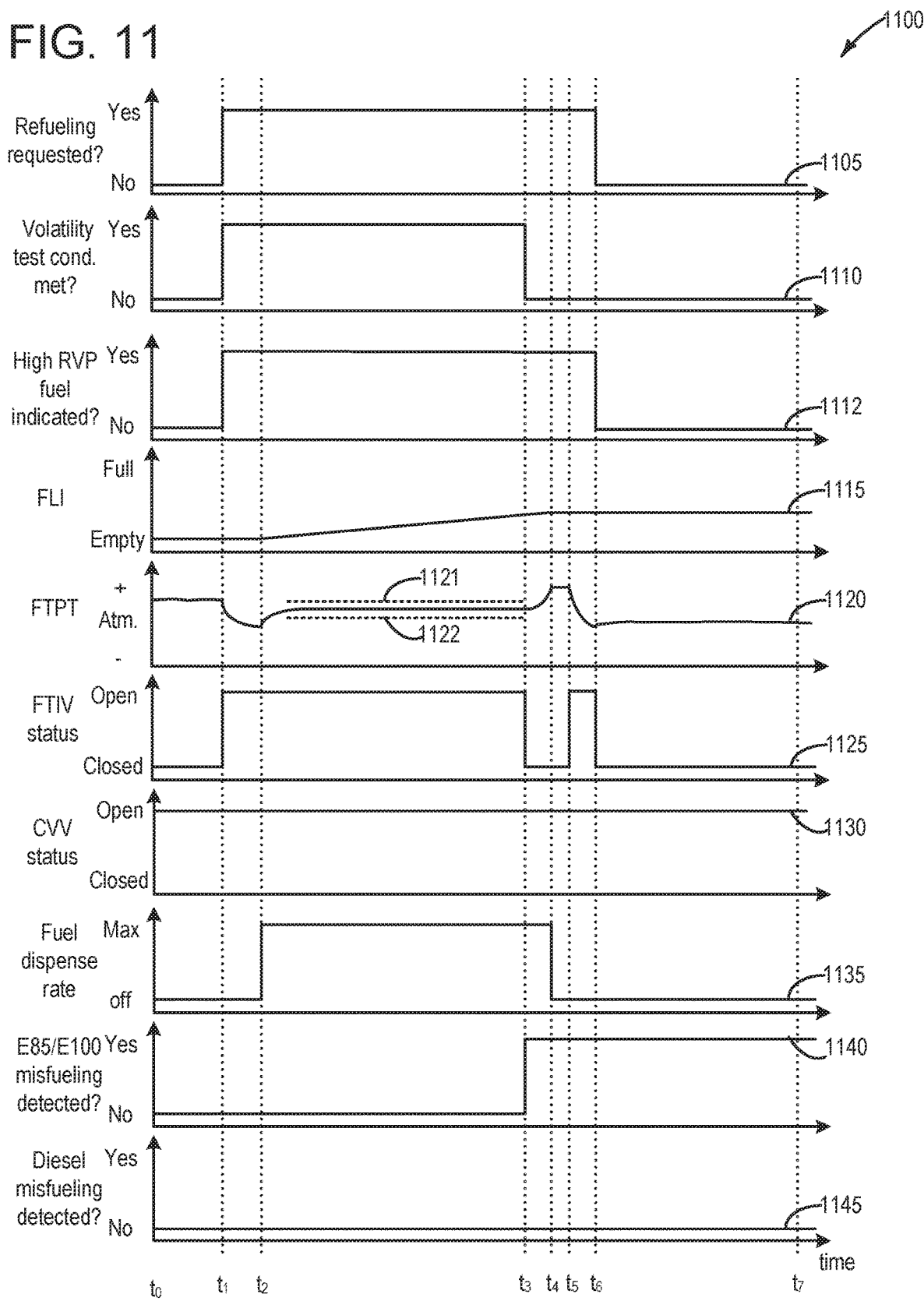

SYSTEMS AND METHODS FOR DETECTION OF VEHICLE MISFUELING

FIELD

The present description relates generally to methods and systems for controlling a vehicle to actively terminate a refueling event responsive to an indication that a type of fuel being added to a fuel tank is not the correct fuel type for the vehicle engine.

BACKGROUND/SUMMARY

Refueling stations for vehicles may have fuel dispenser pumps that dispense gasoline (or other fuel blend) or diesel fuel, to accommodate vehicles that run off of either fuel type. However, if diesel fuel is unknowingly introduced into a gasoline engine, engine parts may be damaged. For example, diesel fuel is heavier and more oily than gasoline. Thus, introduction of diesel fuel into a gasoline engine may result in clogging of fuel injectors, and may further result in spontaneous ignition of the diesel fuel inside gasoline engine cylinders. Such adverse actions may result in high repair costs, associated with rebuilding the vehicle engine, in some examples, in addition to draining out the diesel fuel and flushing the fuel system including the fuel pump, fuel filter, and fuel injectors. In still other examples, if high reid vapor pressure fuel (e.g. 13 psi) is being dispensed from gas stations in a particular vicinity, for example during winter months, and low reid vapor pressure fuel (e.g. E85 or E100) is introduced to a non-flexible fuel vehicle, engine starting problems may result.

To discourage the introduction of diesel fuel into gasoline engines (or vice versa), many gas stations include refueling nozzles that differ for gasoline compared to diesel fuel. For example, gasoline dispenser nozzles may differ from diesel nozzles in diameter. Thus, the nozzles may be designed such that a diesel nozzle does not readily fit into a fuel filler neck configured for a gasoline engine. In still other examples, dispenser nozzles may additionally or alternatively be color coded, to illustrate to a dispenser operator which nozzles are gasoline, or other fuel blend, as compared to diesel fuel. However, in some world markets, a similar nozzle diameter and color may be used for both diesel fuel and gasoline, for example, thus making it challenging to prevent misfueling of vehicles.

Diesel fuel differs from gasoline in that diesel fuel does not vaporize readily, as compared to gasoline. For example, the hydrocarbons in diesel fuel mainly comprise heavy ends (C8-C12), unlike gasoline, which has light ends such as propane and butane that evaporate readily. Similarly, fuel blends such as E85 or E100 differs from gasoline in that E85/E100 does not vaporize readily, unlike gasoline. The inventors herein have thus recognized that differences in fuel volatility may be used as an indication of misfueling.

US Patent Application US 20160061802 A1 teaches a method for determining volatility of fuel in a fuel storage system, including determining that a refueling event has occurred and that the fuel storage system has been subsequently sealed, performing a first pressure measurement at a first time, and a second pressure measurement at a second time (the second time occurring after the first time), determining a pressure evolution rate from the first pressure measurement and the second pressure measurement, and deriving an estimation of the volatility of the fuel from the pressure evolution rate. However, the inventors herein have recognized potential issues with such an approach. Specifically, the method may only be utilized to infer fuel volatility after the fuel storage system has been filled with fuel and subsequently sealed. Thus, the method does not prevent fuel from being added to the fuel storage system, as the method may only detect fuel volatility after the refueling event has completed. Furthermore, US 20160061802 A1 teaches that knowledge of fuel volatility may be useful for controlling fuel injection amount, injection timing, ignition timing, and for conducting diagnostic procedures related to indication of the presence or absence of undesired evaporative emissions, but does not mention the use of the method to infer misfueling of the fuel storage system.

The inventors herein have recognized these issues, and have developed systems and methods to at least partially address the above issues. In one example, a method is provided, comprising during refueling a fuel tank of a vehicle via a refueling dispenser, routing fuel vapors from the fuel tank to a fuel vapor storage canister positioned in an evaporative emissions system that is coupled to the fuel tank; and responsive to an indication of misfueling comprising addition of an incorrect fuel type to the tank, sealing the fuel tank to actively induce a shutoff of the refueling dispenser.

As an example, during refueling, actual pressure in the fuel tank may be monitored via a fuel tank pressure sensor, and an expected pressure may be determined. At least one misfueling pressure threshold may be adjusted based at least in part on the expected pressure in the fuel tank during refueling, and misfueling may be indicated based on whether the actual pressure is above, or below, the adjusted misfueling pressure threshold(s). One example includes monitoring a fuel fill level in the fuel tank during refueling the tank via a fuel level sensor positioned in the fuel tank, and indicating a dispense rate of fuel into the fuel tank based on a fuel fill level change over a predetermined time period. The dispense rate may be determined via multiplying a capacity of the fuel tank by the fuel fill level change over the predetermined time period, and the expected pressure in the fuel tank during refueling may be a function of the dispense rate of fuel into the fuel tank. By monitoring an actual pressure in the fuel tank, an indication of misfueling may be determined by comparing the actual pressure to the misfueling pressure threshold(s). By sealing the fuel tank to actively induce a shutoff of the refueling dispenser responsive to the indication of misfueling, further addition of the incorrect fuel type to the fuel tank may be prevented. Furthermore, the vehicle operator may be alerted to the fact that misfueling has occurred, such that the engine is not activated subsequent to the indication of misfueling, and prior to taking mitigating actions to remedy the misfueling. By preventing engine operation subsequent to an indication of misfueling, complications arising from operating the engine with an incorrect fuel type may be avoided.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 11 shows an example timeline for conducting a misfueling diagnostic during a refueling event where the vehicle comprises a non-flexible fuel vehicle.

DETAILED DESCRIPTION

Figure 1:
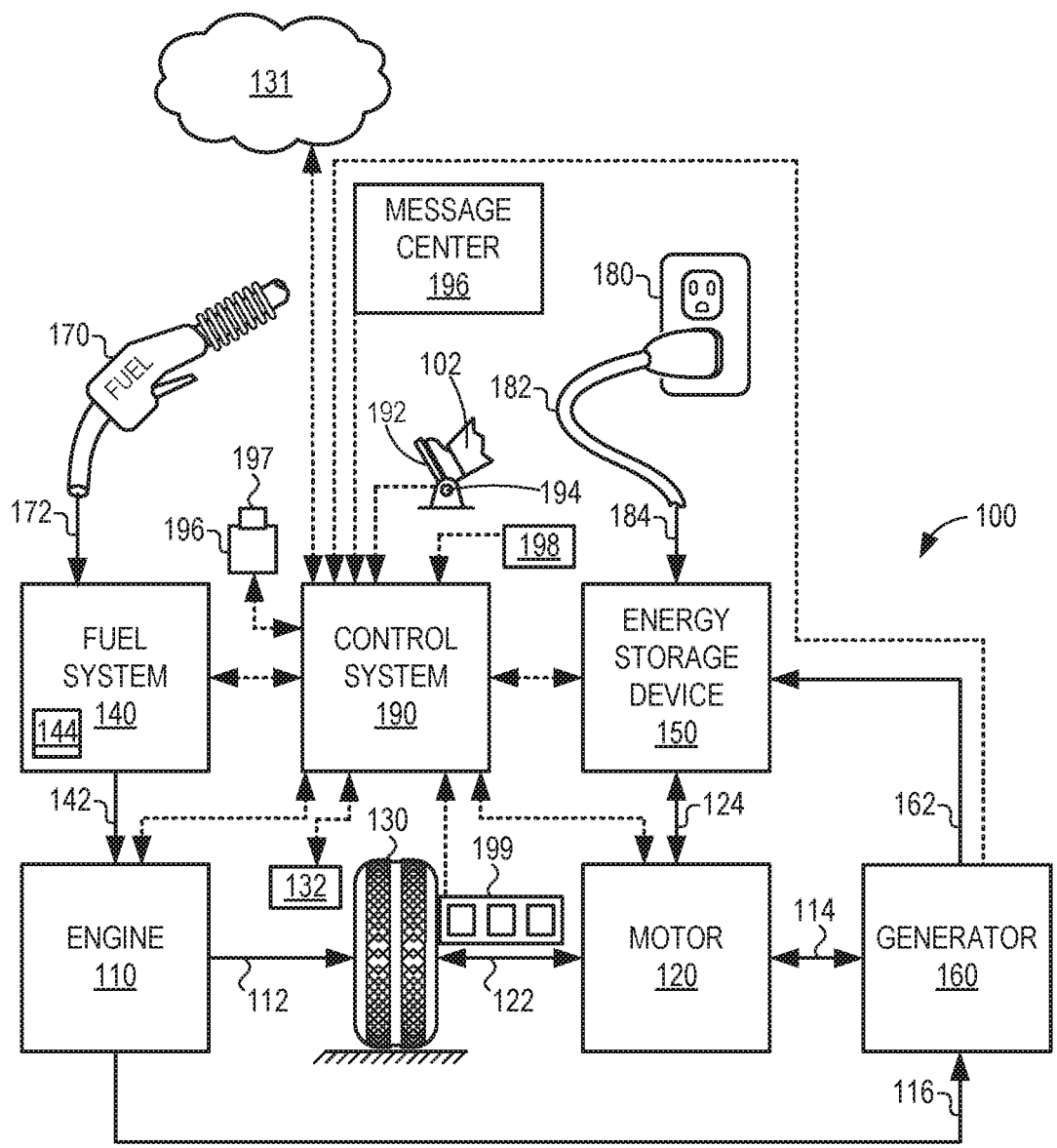
FIG. 1 schematically shows an example vehicle propulsion system.

The following description relates to systems and methods for detecting the addition of an incorrect fuel type to a vehicle fuel tank, during a refueling event. As an example, the vehicle may comprise a hybrid vehicle system, such as the vehicle system illustrated in FIG. 1, where the engine is designed to utilize gasoline (or other fuel blend), and not diesel fuel. In other examples, the vehicle may comprise a vehicle system where the engine is designed to utilize diesel fuel. In still other examples, the vehicle may comprise a non-flexible fuel vehicle, where the vehicle is not designed to run on fuel blends containing ethanol, as an example. While a hybrid vehicle is depicted in FIG. 1, it may be understood that such an example is meant to be illustrative, and in no way limiting. For example, the methods depicted herein may be utilized on a non-hybrid vehicle, without departing from the scope of the present disclosure. The methods depicted herein may be utilized on a vehicle system that includes a fuel system fluidically coupled to an evaporative emissions system, such as the system depicted in FIG. 2. In some examples, the fuel system may be removably fluidically coupled to the evaporative emissions system, via valve means, for example. The evaporative emissions system may include a fuel vapor storage canister, positioned in the evaporative emissions system. During refueling of the vehicle, a controller of the vehicle may calculate a fuel dispense rate from a refueling dispenser, and from the calculated fuel dispense rate, the controller may determine an expected pressure in the fuel tank if the correct fuel is being added to the tank, or if a particular fuel type (e.g. diesel) is being added to the fuel tank at the calculated fuel dispense rate. The expected pressure may be used to adjust at least one misfueling pressure threshold, such that it may be indicated as to whether an incorrect fuel is being added to the fuel tank. For example, FIG. 3A depicts an example refueling event where pressure in the fuel tank is above an adjusted misfueling threshold, which may indicate that the correct fuel (e.g. gasoline or other fuel blend) is being added to the tank. A similar example is depicted in FIG. 3B, where the fuel dispense rate is higher than that illustrated in FIG. 3A. However, in FIG. 3C, pressure in the fuel tank is substantially below the adjusted misfueling threshold, indicating that the incorrect fuel (e.g. diesel) has been added to the fuel tank. In some examples, at least one misfueling pressure threshold may be increased responsive to an increase in the expected pressure. Similarly, at least one misfueling pressure threshold may be decreased responsive to a decrease in the expected pressure.

Figure 4:
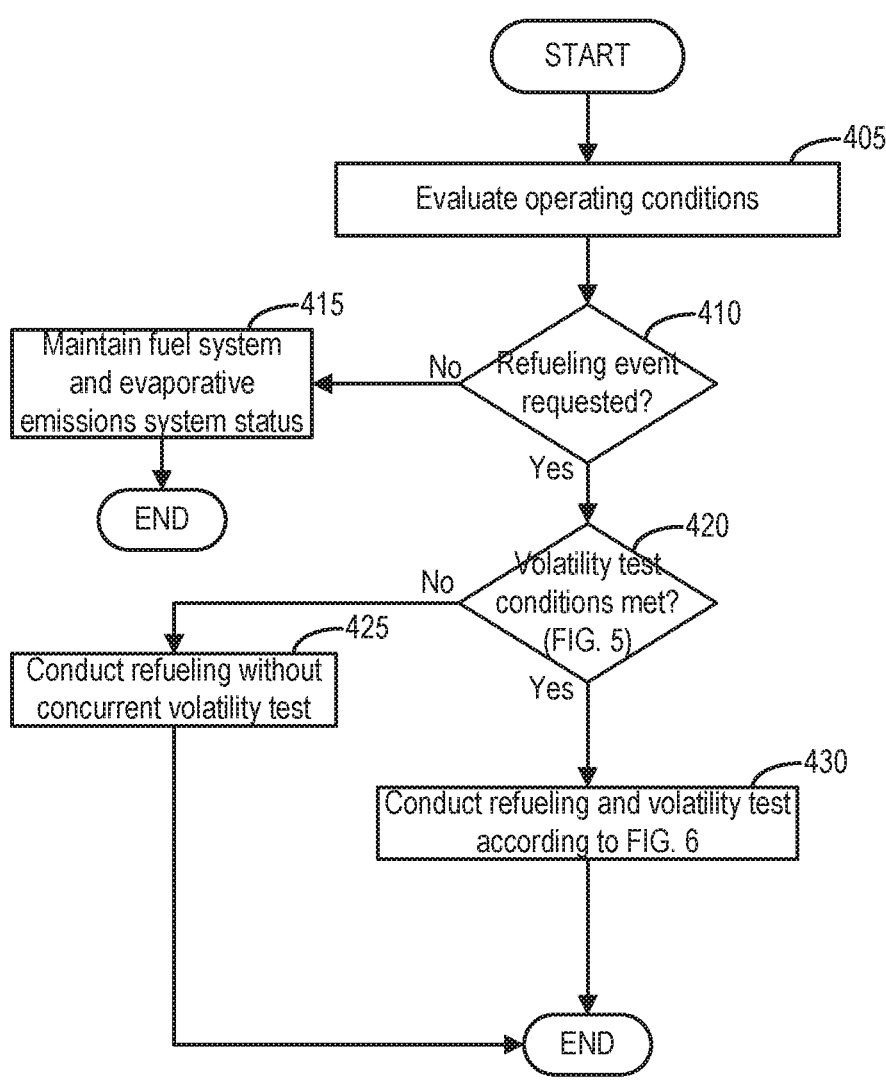
FIG. 4 shows a high-level flowchart for an example method for determining whether conditions are met for conducting a misfueling diagnostic during a refueling event.
Figure 5:
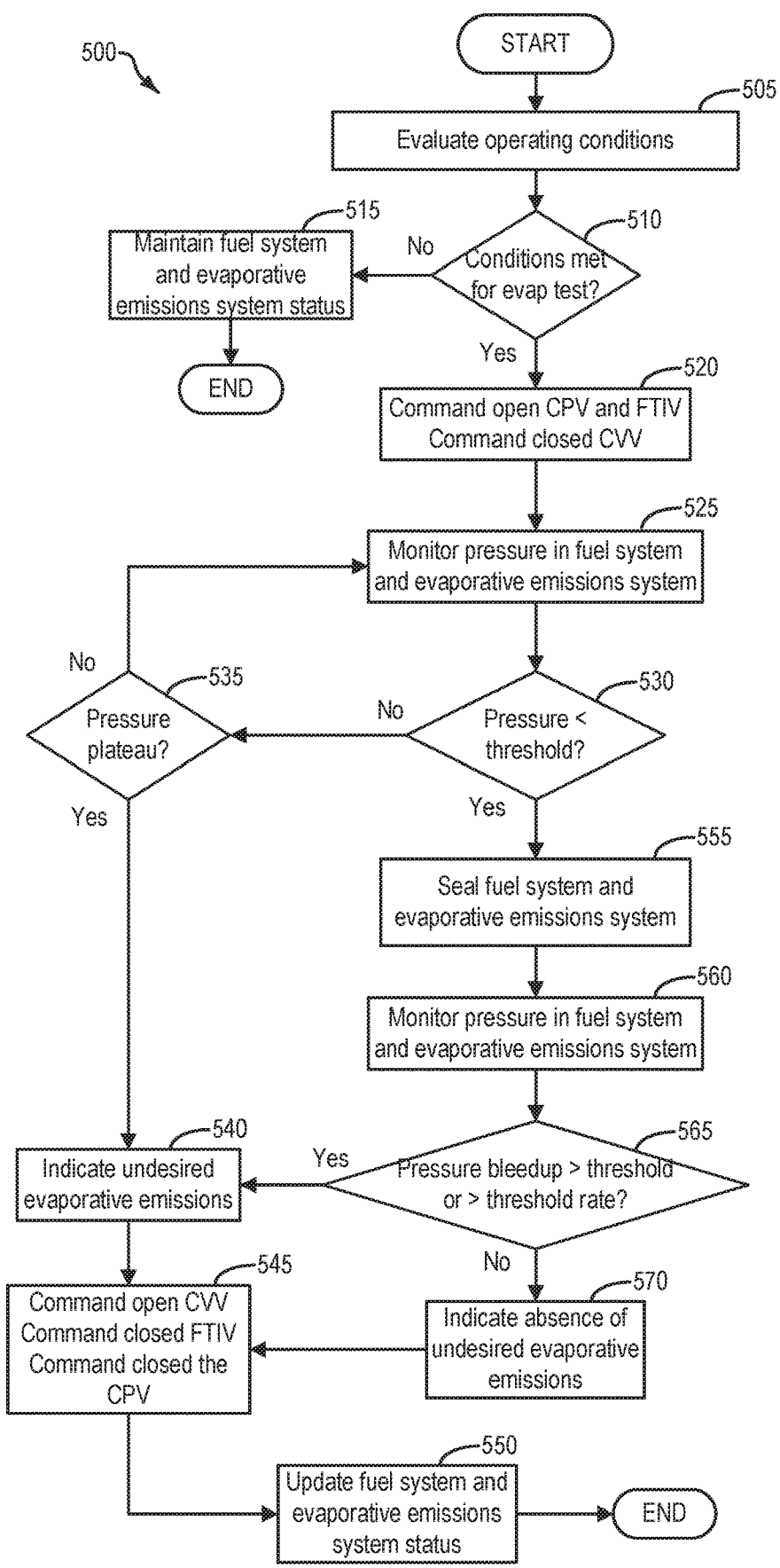
FIG. 5 shows a high-level flowchart for an example method for conducting an evaporative emissions test diagnostic procedure.
Figure 7:
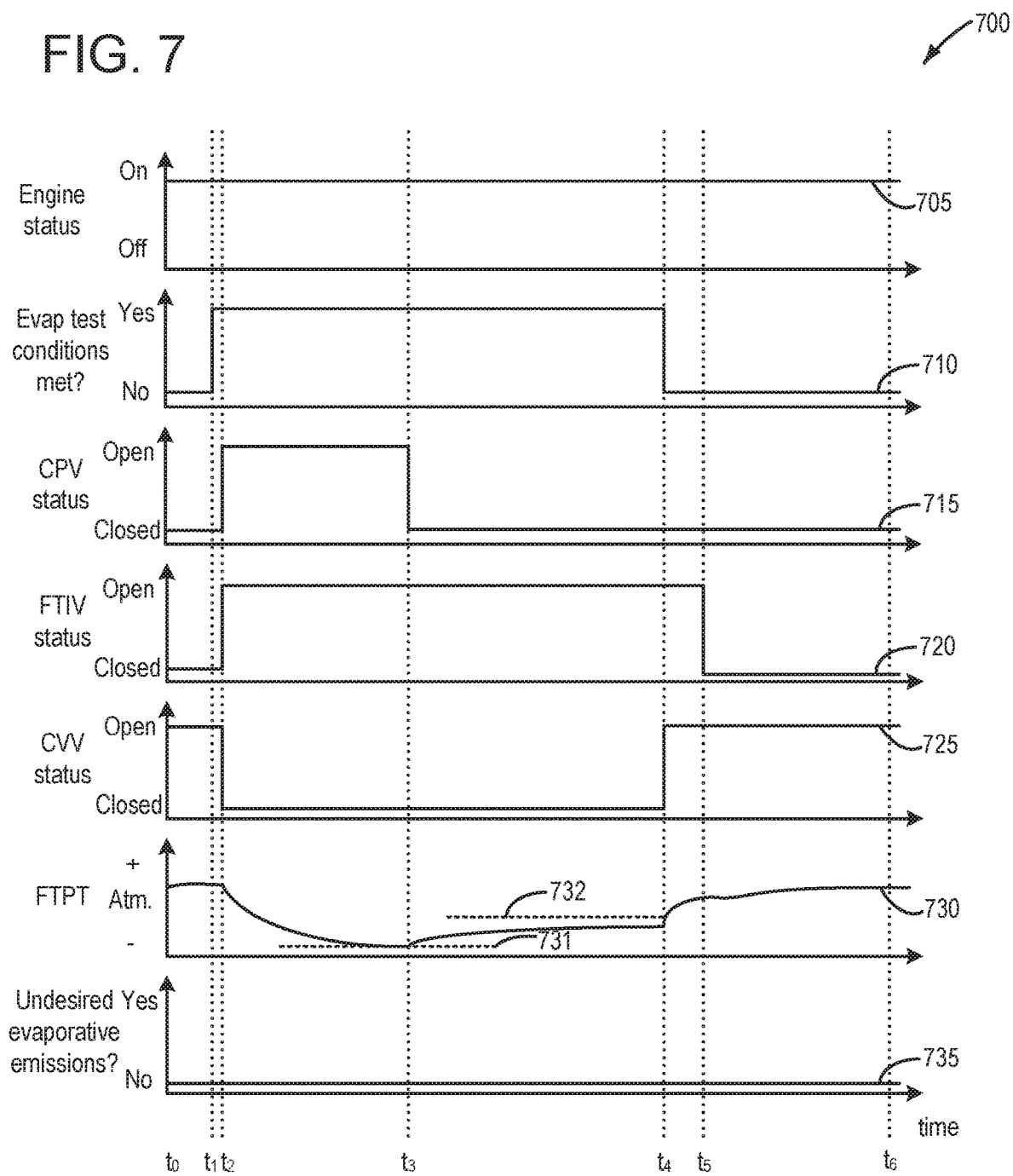
FIG. 7 shows an example timeline for conducting an evaporative emissions test diagnostic for the presence or absence of undesired evaporative emissions.
Figure 8:
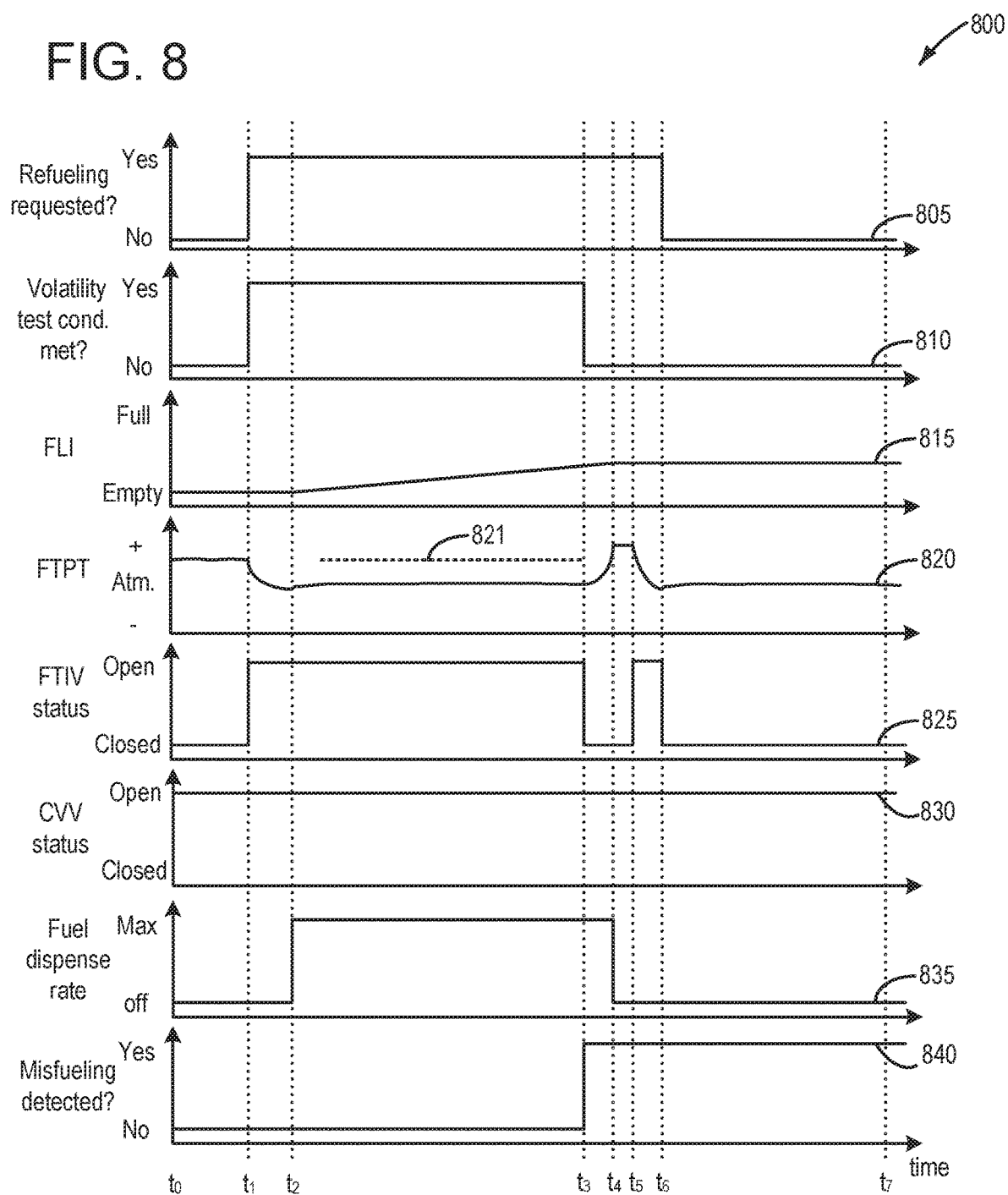
FIG. 8 shows an example timeline for conducting a misfueling diagnostic during a refueling event.

A high level example method for conducting a refueling event while concurrently conducting a misfueling test diagnostic procedure, is depicted in FIG. 4. An entry condition for conducting the misfueling test diagnostic procedure may include an indication of an absence of undesired evaporative emissions in the vehicle fuel system and evaporative emissions system. Accordingly, a method for conducting an evaporative emissions test diagnostic procedure on the vehicle fuel system and evaporative emissions system is depicted in FIG. 5. Responsive to conditions being met for conducting a refueling event and a concurrent misfueling test diagnostic, the refueling event and misfueling test diagnostic may be conducted according to the method illustrated in FIG. 6. A timeline for conducting the evaporative emissions test diagnostic procedure is illustrated in FIG. 7. A timeline for conducting the refueling event and misfueling test diagnostic, is illustrated in FIG. 8.

Figure 9:
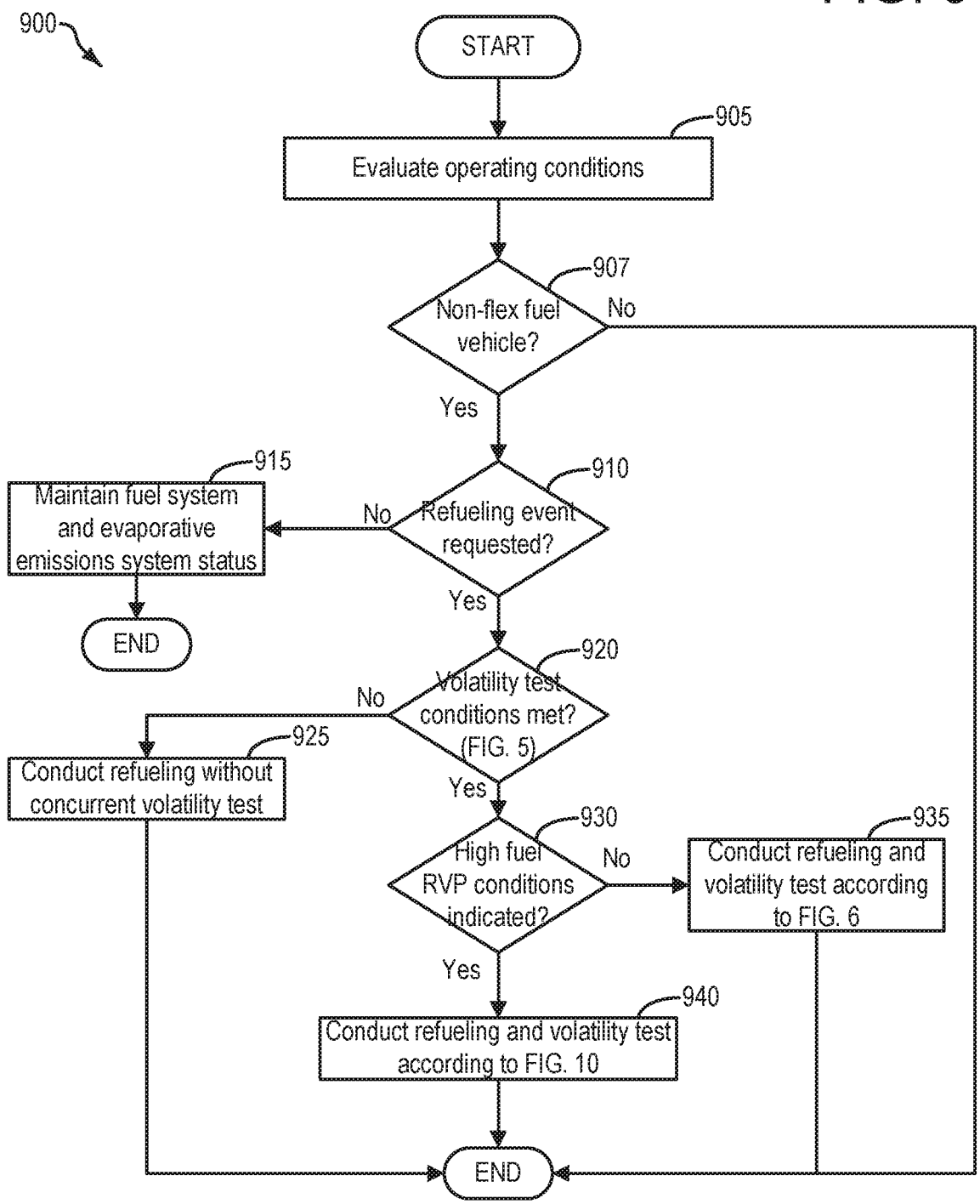
FIG. 9 shows a high-level flowchart for an example method for determining whether conditions are met for conducting a misfueling diagnostic during a refueling event wherein the vehicle comprises a non-flexible-fuel vehicle.

In some examples, a vehicle may comprise a non-flexible-fuel vehicle, and as such it may be desirable to determine whether fuel being added to the fuel tank is a particular fuel blend, for example E85 or E100. More specifically, if high reid vapor pressure fuel were being dispensed from a gas station in a particular vicinity, introduction of low reid vapor pressure fuel (e.g. E85 or E100) into a non-flexible-fuel vehicle fuel tank may result in engine starting problems if mitigating actions are not undertaken. Thus, a high-level example method for determining whether conditions are met for conducting a refueling operation and concurrent misfueling test diagnostic, is illustrated in FIG. 9. If it is indicated that conditions are met for conducting a refueling operation and concurrent misfueling test diagnostic on a non-flexible-fuel vehicle, then such an operation and test diagnostic may be performed according to the method illustrated in FIG. 10. A timeline for conducting the refueling event and misfueling test diagnostic on the non-flexible-fuel vehicle, is illustrated in FIG. 11.

FIG. 1 illustrates an example vehicle propulsion system 100. Vehicle propulsion system 100 includes a fuel burning engine 110 and a motor 120. As a non-limiting example, engine 110 comprises an internal combustion engine and motor 120 comprises an electric motor. Motor 120 may be configured to utilize or consume a different energy source than engine 110. For example, engine 110 may consume a liquid fuel (e.g., gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e., set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some examples. However, in other examples, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some examples, motor 120 may propel the vehicle via a first set of drive wheels and engine 110 may propel the vehicle via a second set of drive wheels.

In other examples, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160 as indicated by arrow 116, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some examples, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. Control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other examples, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some examples, fuel tank 144 may be configured to store the fuel received from fuel dispensing device 170 until it is supplied to engine 110 for combustion. In some examples, control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

The vehicle propulsion system 100 may also include an ambient temperature/humidity sensor 198, and a roll stability control sensor, such as a lateral and/or longitudinal and/or yaw rate sensor(s) 199. The vehicle instrument panel 196 may include indicator light(s) and/or a text-based display in which messages are displayed to an operator. The vehicle instrument panel 196 may also include various input portions for receiving an operator input, such as buttons, touch screens, voice input/recognition, etc. For example, the vehicle instrument panel 196 may include a refueling button 197 which may be manually actuated or pressed by a vehicle operator to initiate refueling. For example, as described in more detail below, in response to the vehicle operator actuating refueling button 197, a fuel tank in the vehicle may be depressurized so that refueling may be performed.

Control system 190 may be communicatively coupled to other vehicles or infrastructures using appropriate communications technology, as is known in the art. For example, control system 190 may be coupled to other vehicles or infrastructures via a wireless network 131, which may comprise Wi-Fi, Bluetooth, a type of cellular service, a wireless data transfer protocol, and so on. Control system 190 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 190 may be communicatively coupled to other vehicles or infrastructures via a wireless network 131 and the internet (e.g. cloud), as is commonly known in the art.

Vehicle system 100 may also include an on-board navigation system 132 (for example, a Global Positioning System) that an operator of the vehicle may interact with. The navigation system 132 may include one or more location sensors for assisting in estimating vehicle speed, vehicle altitude, vehicle position/location, etc. This information may be used to infer engine operating parameters, such as local barometric pressure. As discussed above, control system 190 may further be configured to receive information via the internet or other communication networks. Information received from the GPS may be cross-referenced to information available via the internet to determine local weather conditions, local vehicle regulations, etc. In one example, information received from the GPS may be cross-referenced to information available via the internet to indicate a climate and locality of a vehicle, such that during a refueling event it may be determined whether an incorrect fuel type is being added to the vehicle fuel tank. In such an example, fuel tank pressure thresholds for indicating misfueling may be set or adjusted responsive to an expected reid vapor pressure (RVP) of fuel provided at a fueling station. More specifically, depending on a time of year, RVP of fuel provided by refueling stations may differ, such that in winter months, RVP may be around 13 psi (e.g. high RVP), whereas in summer, RVP may be substantially lower. Thus, in some examples, information received via the internet or other communication networks including GPS may be utilized by the vehicle to determine whether the vehicle is attempting to refuel in summer or winter months, wherein misfueling pressure thresholds may be adjusted responsive to the expected RVP of fuel. As such, that it may be indicated to a vehicle operator whether the fuel tank has been refueled with an incorrect fuel type for the particular vehicle. In an alternative example, the vehicle instrument panel 196 may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

Figure 2:
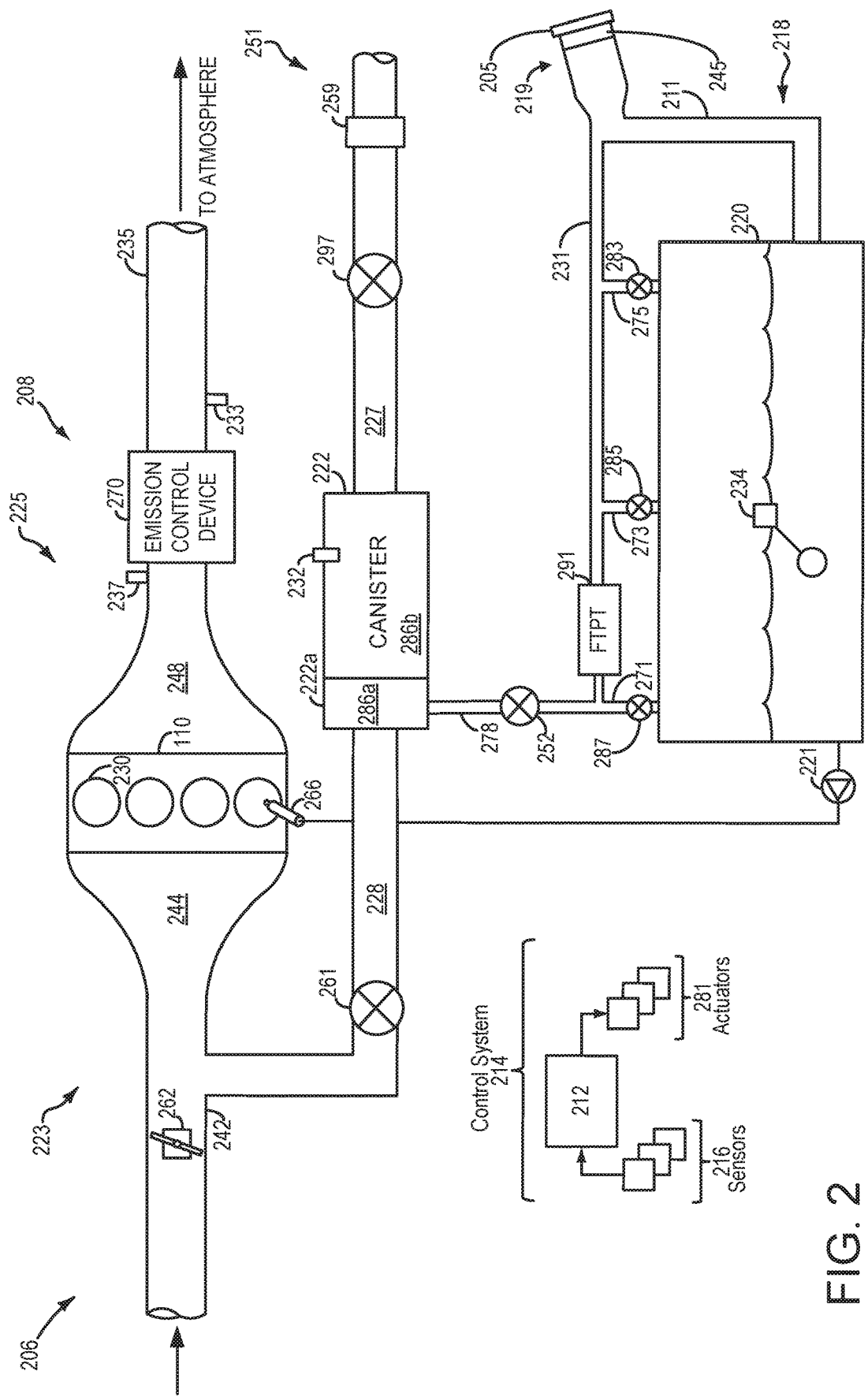
FIG. 2 schematically shows an example vehicle system with a fuel system and an evaporative emissions system.
Figure 3A:
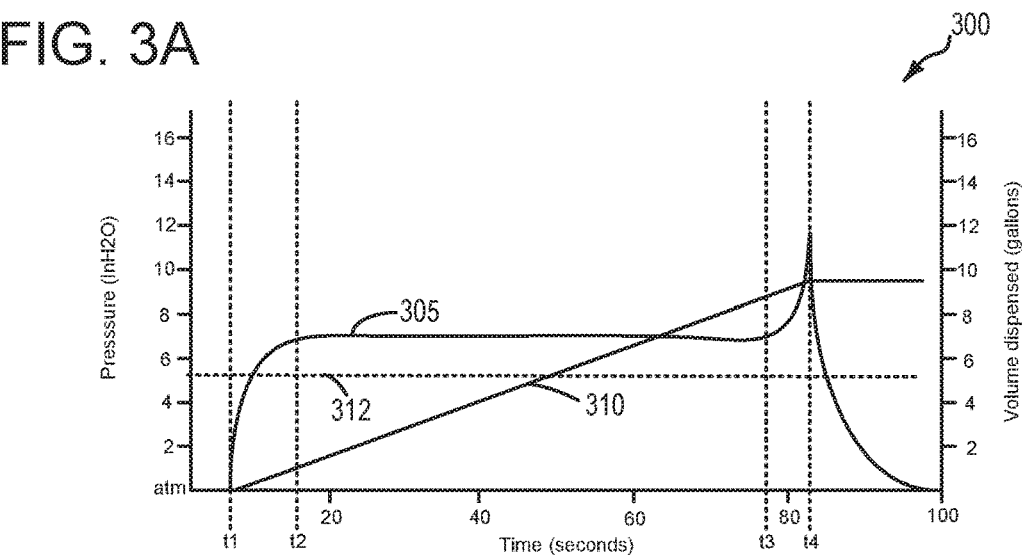
FIGS. 3A-3B schematically illustrate fuel tank pressure profiles during the addition of gasoline to the vehicle fuel tank.
Figure 3B:
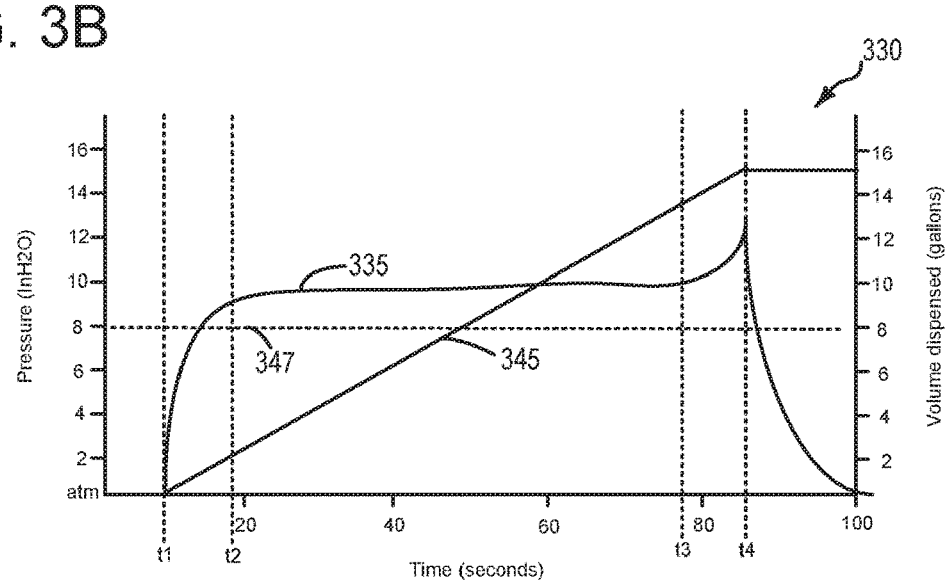

FIG. 2 shows a schematic depiction of a vehicle system 206. The vehicle system 206 includes an engine system 208 coupled to an emissions control system 251 and a fuel system 218. Emission control system 251 includes a fuel vapor container or canister 222 which may be used to capture and store fuel vapors. In some examples, vehicle system 206 may be a hybrid electric vehicle system. However, it may be understood that the description herein may refer to a non-hybrid vehicle, for example a vehicle only-equipped with an engine and not an onboard energy storage device, without departing from the scope of the present disclosure.

The engine system 208 may include an engine 110 having a plurality of cylinders 230. The engine 110 includes an engine air intake 223 and an engine exhaust 225. The engine air intake 223 includes a throttle 262 in fluidic communication with engine intake manifold 244 via an intake passage 242. Further, engine air intake 223 may include an air box and filter (not shown) positioned upstream of throttle 262. The engine exhaust system 225 includes an exhaust manifold 248 leading to an exhaust passage 235 that routes exhaust gas to the atmosphere. The engine exhaust system 225 may include one or more exhaust catalyst 270, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 218 may include a fuel tank 220 coupled to a fuel pump system 221. The fuel pump system 221 may include one or more pumps for pressurizing fuel delivered to the injectors of engine 110, such as the example injector 266 shown. While only a single injector 266 is shown, additional injectors are provided for each cylinder. It will be appreciated that fuel system 218 may be a return-less fuel system, a return fuel system, or various other types of fuel system. Fuel tank 220 may hold a plurality of fuel blends, including fuel with a range of alcohol concentrations, such as various gasoline-ethanol blends, including E10, E85, gasoline, etc., and combinations thereof. A fuel level sensor 234 located in fuel tank 220 may provide an indication of the fuel level ("Fuel Level Input") to controller 212. As depicted, fuel level sensor 234 may comprise a float connected to a variable resistor. Alternatively, other types of fuel level sensors may be used.

Vapors generated in fuel system 218 may be routed to an evaporative emissions control system 251 which includes a fuel vapor canister 222 via vapor recovery line 231, before being purged to the engine air intake 223. Vapor recovery line 231 may be coupled to fuel tank 220 via one or more conduits and may include one or more valves for isolating the fuel tank during certain conditions. For example, vapor recovery line 231 may be coupled to fuel tank 220 via one or more or a combination of conduits 271, 273, and 275.

Further, in some examples, one or more fuel tank vent valves may be positioned in conduits 271, 273, or 275. Among other functions, fuel tank vent valves may allow a fuel vapor canister of the emissions control system to be maintained at a low pressure or vacuum without increasing the fuel evaporation rate from the tank (which would otherwise occur if the fuel tank pressure were lowered). For example, conduit 271 may include a grade vent valve (GVV) 287, conduit 273 may include a fill limit venting valve (FLVV) 285, and conduit 275 may include a grade vent valve (GVV) 283. Further, in some examples, recovery line 231 may be coupled to a fuel filler system 219. In some examples, fuel filler system may include a fuel cap 205 for sealing off the fuel filler system from the atmosphere. Refueling system 219 is coupled to fuel tank 220 via a fuel filler pipe or neck 211.

Further, refueling system 219 may include refueling lock 245. In some examples, refueling lock 245 may be a fuel cap locking mechanism. The fuel cap locking mechanism may be configured to automatically lock the fuel cap in a closed position so that the fuel cap cannot be opened. For example, the fuel cap 205 may remain locked via refueling lock 245 while pressure or vacuum in the fuel tank is greater than a threshold. In response to a refuel request, e.g., a vehicle operator initiated request, the fuel tank may be depressurized and the fuel cap unlocked after the pressure or vacuum in the fuel tank falls below a threshold. A fuel cap locking mechanism may be a latch or clutch, which, when engaged, prevents the removal of the fuel cap. The latch or clutch may be electrically locked, for example, by a solenoid, or may be mechanically locked, for example, by a pressure diaphragm.

In some examples, refueling lock 245 may be a filler pipe valve located at a mouth of fuel filler pipe 211. In such examples, refueling lock 245 may not prevent the removal of fuel cap 205. Rather, refueling lock 245 may prevent the insertion of a refueling pump into fuel filler pipe 211. The filler pipe valve may be electrically locked, for example by a solenoid, or mechanically locked, for example by a pressure diaphragm.

In some examples, refueling lock 245 may be a refueling door lock, such as a latch or a clutch which locks a refueling door located in a body panel of the vehicle. The refueling door lock may be electrically locked, for example by a solenoid, or mechanically locked, for example by a pressure diaphragm.

In examples where refueling lock 245 is locked using an electrical mechanism, refueling lock 245 may be unlocked by commands from controller 212, for example, when a fuel tank pressure decreases below a pressure threshold. In examples where refueling lock 245 is locked using a mechanical mechanism, refueling lock 245 may be unlocked via a pressure gradient, for example, when a fuel tank pressure decreases to atmospheric pressure.

Emissions control system 251 may include one or more emissions control devices, such as one or more fuel vapor canisters 222 filled with an appropriate adsorbent 286b, the canisters are configured to temporarily trap fuel vapors (including vaporized hydrocarbons) during fuel tank refilling operations and "running loss" (that is, fuel vaporized during vehicle operation). In one example, the adsorbent 286b used is activated charcoal. Emissions control system 251 may further include a canister ventilation path or vent line 227 which may route gases out of the canister 222 to the atmosphere when storing, or trapping, fuel vapors from fuel system 218.

Canister 222 may include a buffer 222a (or buffer region), each of the canister and the buffer comprising the adsorbent. As shown, the volume of buffer 222a may be smaller than (e.g., a fraction of) the volume of canister 222. The adsorbent 286a in the buffer 222a may be same as, or different from, the adsorbent in the canister (e.g., both may include charcoal). Buffer 222a may be positioned within canister 222 such that during canister loading, fuel tank vapors are first adsorbed within the buffer, and then when the buffer is saturated, further fuel tank vapors are adsorbed in the canister. In comparison, during canister purging, fuel vapors are first desorbed from the canister (e.g., to a threshold amount) before being desorbed from the buffer. In other words, loading and unloading of the buffer is not linear with the loading and unloading of the canister. As such, the effect of the canister buffer is to dampen any fuel vapor spikes flowing from the fuel tank to the canister, thereby reducing the possibility of any fuel vapor spikes going to the engine. One or more temperature sensors 232 may be coupled to and/or within canister 222. As fuel vapor is adsorbed by the adsorbent in the canister, heat is generated (heat of adsorption). Likewise, as fuel vapor is desorbed by the adsorbent in the canister, heat is consumed. In this way, the adsorption and desorption of fuel vapor by the canister may be monitored and estimated based on temperature changes within the canister.

Vent line 227 may also allow fresh air to be drawn into canister 222 when purging stored fuel vapors from fuel system 218 to engine intake 223 via purge line 228 and purge valve 261. For example, purge valve 261 may be normally closed but may be opened during certain conditions so that vacuum from engine intake manifold 244 is provided to the fuel vapor canister for purging. In some examples, vent line 227 may include an air filter 259 disposed therein upstream of a canister 222.

In some examples, the flow of air and vapors between canister 222 and the atmosphere may be regulated by a canister vent valve 297 coupled within vent line 227. When included, the canister vent valve 297 may be a normally open valve, so that fuel tank isolation valve 252 (FTIV) may control venting of fuel tank 220 with the atmosphere. FTIV 252 may be positioned between the fuel tank and the fuel vapor canister 222 within conduit 278. FTIV 252 may be a normally closed valve, that when opened, allows for the venting of fuel vapors from fuel tank 220 to fuel vapor canister 222. Fuel vapors may then be vented to atmosphere, or purged to engine intake system 223 via canister purge valve 261.

Fuel system 218 may be operated by controller 212 in a plurality of modes by selective adjustment of the various valves and solenoids. For example, the fuel system may be operated in a fuel vapor storage mode (e.g., during a fuel tank refueling operation and with the engine not combusting air and fuel), wherein the controller 212 may open isolation valve 252 while closing canister purge valve (CPV) 261 to direct refueling vapors into canister 222 while preventing fuel vapors from being directed into the intake manifold.

As another example, the fuel system may be operated in a refueling mode (e.g., when fuel tank refueling is requested by a vehicle operator), wherein the controller 212 may open isolation valve 252, while maintaining canister purge valve 261 closed, to depressurize the fuel tank before allowing enabling fuel to be added therein. As such, isolation valve 252 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine combusting air and fuel), wherein the controller 212 may open canister purge valve 261 while closing isolation valve 252. Herein, the vacuum generated by the intake manifold of the operating engine may be used to draw fresh air through vent 227 and through fuel vapor canister 222 to purge the stored fuel vapors into intake manifold 244. In this mode, the purged fuel vapors from the canister are combusted in the engine. The purging may be continued until the stored fuel vapor amount in the canister is below a threshold.

Controller 212 may comprise a portion of a control system 214. In some examples, control system 214 may be the same as control system 190, illustrated in FIG. 1. Control system 214 is shown receiving information from a plurality of sensors 216 (various examples of which are described herein) and sending control signals to a plurality of actuators 281 (various examples of which are described herein). As one example, sensors 216 may include exhaust gas sensor 237 located upstream of the emission control device 270, temperature sensor 233, pressure sensor 291, and canister temperature sensor 232. Other sensors such as pressure, temperature, air/fuel ratio, and composition sensors may be coupled to various locations in the vehicle system 206. As another example, the actuators may include throttle 262, fuel tank isolation valve 252, canister purge valve 261, and canister vent valve 297. The control system 214 may include a controller 212. The controller may receive input data from the various sensors, process the input data, and trigger the actuators in response to the processed input data based on instruction or code programmed therein corresponding to one or more routines. Example control routines are described herein with regard to FIGS. 4-6, and FIGS. 9-10.

In some examples, the controller may be placed in a reduced power mode or sleep mode, wherein the controller maintains essential functions only, and operates with a lower battery consumption than in a corresponding awake mode. For example, the controller may be placed in a sleep mode following a vehicle-off event in order to perform a diagnostic routine at a duration after the vehicle-off event. The controller may have a wake input that allows the controller to be returned to an awake mode based on an input received from one or more sensors. For example, the opening of a vehicle door may trigger a return to an awake mode. In other examples, particularly with regard to the methods depicted in FIG. 4 and FIG. 6, and FIG. 9 and FIG. 10, the controller may need to be awake in order to conduct such methods. In such an example, the controller may stay awake for a duration referred to as a time period where the controller is maintained awake to perform extended shutdown functions, such that the controller may be awake during a refueling event. In another example, a wakeup capability may enable a circuit to wake the controller when refueling is underway.

Undesired evaporative emissions detection routines may be intermittently performed by controller 212 on fuel system 218 and/or evaporative emissions system 251 to confirm that undesired evaporative emissions are not present in the fuel system and/or evaporative emissions system. As such, evaporative emissions detection routines may be performed while the engine is off (engine-off test) using engine-off natural vacuum (EONV) generated due to a change in temperature and pressure at the fuel tank following engine shutdown and/or with vacuum supplemented from a vacuum pump. Alternatively, evaporative emissions detection routines may be performed while the engine is running by operating a vacuum pump and/or using engine intake manifold vacuum. In some configurations, a canister vent valve (CVV) 297 may be coupled within vent line 227. CVV 297 may function to adjust a flow of air and vapors between canister 222 and the atmosphere. The CVV may also be used for diagnostic routines. When included, the CVV may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the CVV may be opened to allow a flow of fresh air to strip the fuel vapors stored in the canister. In some examples, CVV 297 may be a solenoid valve wherein opening or closing of the valve is performed via actuation of a canister vent solenoid. In particular, the canister vent valve may be an open that is closed upon actuation of the canister vent solenoid. In some examples, CVV 297 may be configured as a latchable solenoid valve. In other words, when the valve is placed in a closed configuration, it latches closed without requiring additional current or voltage. For example, the valve may be closed with a 100 ms pulse, and then opened at a later time point with another 100 ms pulse. In this way, the amount of battery power required to maintain the CVV closed is reduced. In particular, the CVV may be closed while the vehicle is off, thus maintaining battery power while maintaining the fuel emissions control system sealed from atmosphere.

As discussed above, fuel tank 220 may hold a plurality of fuel blends. However, the introduction of diesel fuel into a tank of a vehicle that is not configured to run on diesel fuel (or vice versa) may result in a variety of issues. Specifically, engine parts (e.g. fuel injectors) may become compromised and may not function as desired after introduction of diesel fuel into the tank and subsequent engine operation. Another example may include spontaneous ignition of the diesel fuel inside gasoline engine cylinders. Such examples may result in the vehicle needing to be repaired. Thus, it may be desirable to detect the presence of misfueling (e.g. adding diesel fuel to a fuel tank in a vehicle designed to run on gasoline) during a refueling event, such that the vehicle is not subsequently driven with engine operation. As will be discussed in detail below, by monitoring fuel volatility of the fuel being added to a fuel tank during a refueling event, it may be determined whether diesel fuel is being added to a fuel tank in a vehicle configured to run on gasoline, or other fuel blend, that does not comprise diesel fuel. In another example, a similar approach may be utilized to indicate whether gasoline, or other fuel blend, is being added to a fuel tank in a vehicle configured to run on diesel fuel.

In still another example, a similar approach may be utilized to indicate whether fuel containing a high percentage of ethanol (e.g. E85, E100), is being added to a non-flexible-fuel vehicle (non-flex-fuel vehicle). More specifically, certain vehicles, termed flexible-fuel vehicles, may be designed to run on gasoline blended with a percentage of ethanol (or methanol). Introduction of E85 or E100 into non-flex-fuel vehicles may thus, under some conditions, result in engine starting problems, or other complications. As fuel volatility of E85 and E100 may differ from volatility of a desired fuel for a non-flex-fuel vehicle, by indicating whether E85 or E100 has been added to a non-flex-fuel vehicle, issues related to engine starting and other complications may be reduced or avoided.

As will be discussed in further detail below, in some examples it may be indicated whether diesel fuel is being added to a non-flex-fuel vehicle, whether E85 or E100 is being added to the non-flex-fuel vehicle, or whether the desired fuel (e.g. high RVP fuel) is being added to the non-flex-fuel vehicle. Such a determination may be accomplished by setting/adjusting at least two fuel tank pressure threshold(s) (misfueling pressure thresholds), where one misfueling pressure threshold is adjusted based on expected pressure if diesel fuel were being added to the fuel tank, and where another misfueling pressure threshold is adjusted based on expected pressure if high reid vapor pressure fuel were being added to the fuel tank. In such an example, it may be indicated that diesel fuel is being added to the fuel tank responsive to actual pressure in the fuel tank during refueling being below both of the at least two misfueling pressure thresholds. It may be further indicated that E85 or E100 is being added to the fuel tank responsive to actual pressure in the fuel tank during refueling being above one misfueling pressure threshold (e.g. misfueling pressure threshold based on expected pressure if diesel fuel were being added), but below the other misfueling pressure threshold (e.g. misfueling pressure threshold based on expected pressure if high reid vapor pressure were being added). In still another example, it may be indicated that high reid vapor pressure fuel (e.g. the correct fuel type) is being added to the fuel tank responsive to actual pressure in the fuel tank during refueling being above both misfueling pressure thresholds. Turning now to FIG. 3A, a refueling event 300 is graphically illustrated. More specifically, a pressure profile 305 of pressure in a vehicle fuel tank during a refueling event, is shown. Actual pressure in the fuel tank may be monitored, for example, via a fuel tank pressure transducer (FTPT) (e.g. 291). Furthermore, a dispersed fuel amount 310, may be indicated via a fuel level sensor (e.g. 234). An x-axis of FIG. 3A depicts time in seconds. A first y-axis depicts pressure in the fuel tank, in InH2O. A second y-axis depicts a volume of fuel dispensed, in gallons. It may be understood that a dispense rate of a refueling dispenser may constitute an uncontrolled variable in the refueling process, where refueling dispense rate (flow rate) may vary depending on an age of the gas station pump, a level of fuel in an underground tank, etc. Thus, in FIG. 3A, it may be understood that fuel is being dispensed at a rate of approximately 7 gallons per minute.

At time t1, fuel begins being added to the tank. Between time t1 and t2, an initial flash upon addition of fuel to the fuel tank results in an abrupt initial pressure increase. As will be discussed in more detail below, an initial pressure flash may be indicative of gasoline (or other fuel blend) being added to the tank, and may not be indicative of diesel fuel being added to the tank.

At time t2, pressure in the tank reaches a plateau between 6-8 InH2O. Between time t2 and t3, fuel continues to be dispersed into the tank. Accordingly, fuel level in the tank, as indicated by a fuel level sensor (e.g. 234) and represented by plot 310, is indicated to rise. The pressure plateau reached in FIG. 3A during the refueling event may be a function of the dispense rate (e.g. 7 gallons per minute). A refuel fill rate may be determined via the vehicle controller (e.g. 212) based on the fuel level sensor, and a capacity of the fuel tank being refueled, where the capacity may be programmed into the vehicle controller memory, for example. More specifically, a rate of change in fuel level in the tank (dFuel level/dt) over a predetermined time period may be multiplied by fuel tank capacity (in gallons) to indicate a fuel fill rate, as represented by the following equation:

$$\text{Fill rate} = d(\text{Fuel level})/dt * \text{fuel tank capacity (in gallons)} \quad (1)$$

As an example, if fuel tank capacity is 25 gallons and the fuel level starts at 10%, and where 30 seconds later the fuel level is at 30%, and the fuel level is monotonically rising, then the fuel fill rate may be $\{[(0.3-0.1/30 \text{ sec}]*60 \text{ sec/min}\}*25 \text{ gallons}=10 \text{ gallons/minute}$. As indicated, it may be understood that fuel fill rate may be calculated independent of fuel tank pressure. By determining a fuel fill rate, a misfueling pressure threshold for determining whether gasoline is being added to the tank, may be adjusted. It may thus be understood that adjusting the misfueling pressure threshold for indicating misfueling of the tank may be based on the expected fuel tank pressure in the fuel tank during refueling, where the expected fuel tank pressure is a function of fuel dispense rate. For example, if a fuel fill rate is determined to be approximately 7 gallons per minute, then a misfueling threshold 312 may be set near 6-7 InH2O. In other words, with a fuel fill rate of 7 gallons per minute, and a known fuel tank capacity, it may be indicated that pressure in the fuel tank (e.g. pressure plateau) may be expected to be near 6-7 InH2O. In some examples, the misfueling threshold 312 may be set 1 InH2O below the expected fuel tank pressure. In other examples, the misfueling threshold 312 may be set 2 InH2O, or 3 InH2O, below the expected fuel tank pressure, where the expected fuel tank pressure is a function of indicated fuel fill rate. Such examples are meant to be illustrative, and in no way limiting. As the expected fuel tank pressure is a function of fuel fill rate, it may be understood that adjusting the misfueling pressure threshold based on the expected fuel tank pressure in the fuel tank may comprise increasing the misfueling pressure threshold responsive to an increase in the fuel dispense rate, and decreasing the misfueling pressure threshold responsive to a decrease in the fuel dispense rate.

If it is determined that actual pressure in the fuel tank (as monitored via a fuel tank pressure transducer, for example) during refueling is below the adjusted misfueling threshold 312, then it may be indicated that diesel fuel is being added to the fuel tank, rather than gasoline (or other fuel blend). In other words, in a case where the vehicle is configured to run on gasoline or other fuel blend that does not include diesel fuel, an indication of misfueling of the fuel tank via an indicated actual pressure below the adjusted misfueling pressure threshold, may include an indication of the addition of diesel fuel to the fuel tank. In such an example where misfueling is detected, fueling of the fuel tank may be actively discontinued, as will be discussed in further detail below.

In the example refueling event 300 depicted in FIG. 3A, pressure in the fuel tank is above adjusted misfueling threshold 312. Thus, it may be indicated that gasoline (or other fuel blend) is being added to the tank, and not diesel fuel. Thus, refueling may be allowed to proceed without actively discontinuing the refueling event.

Between time t3 and t4, pressure in the fuel tank is indicated to abruptly rise. An abrupt rise in fuel tank pressure may be due to fuel level in the fuel tank reaching a level near the capacity of the fuel tank, such that a fill limiting vent valve (FLVV) (e.g. 285) may be closed. With the FLVV closed, pressure in the tank may abruptly increase, until pressure reaches a level where the refueling dispenser is automatically induced to shut off the dispensing of fuel.

Thus, at time t4, pressure is indicated to reach a fuel tank pressure (e.g. 12 InH2O) at which point the refueling dispenser is triggered to shut off. With the refueling dispenser triggered to shut off at time t4, fuel level in the fuel tank reaches a plateau, indicated by plot 310. Subsequent to the refueling dispenser being shutoff, pressure in the fuel tank may return to atmospheric pressure (atm).

As discussed, a misfueling threshold may be adjusted as a function of a determined fuel fill rate, where the misfueling threshold may be set based on an expected fuel tank pressure during a refueling event. Accordingly, turning to FIG. 3B, another refueling event 330 is graphically illustrated. More specifically, a pressure profile 335 of pressure in a vehicle fuel tank during a refueling event, is shown. Actual pressure in the fuel tank may be monitored via an FTPT, and a dispersed amount of fuel 345, may be indicated via a fuel level sensor (e.g. 234). An x-axis of FIG. 3B depicts time in seconds, a first y-axis depicts pressure in the fuel tank (in InH2O), and a second y-axis depicts a volume of fuel dispensed, in gallons. As discussed above, a dispense rate of a refueling dispenser may vary depending on the particular refueling dispenser. Thus, in FIG. 3B, it may be understood that fuel is being dispersed at a rate of approximately 10 gallons per minute.

At time t1, fuel begins being added to the tank. Between time t1 and t2, an initial flash upon addition of fuel to the fuel tank results in an abrupt initial pressure increase. Such an initial flash may be indicative of gasoline (or other fuel blend) being added to the tank, and may not be indicative of diesel fuel being added to the tank, as discussed above with regard to FIG. 3A.

At time t2, pressure in the tank reaches a plateau near 10 InH2O. Between time t2 and t3, fuel continues to be dispersed into the tank. Accordingly, fuel level in the tank, as indicated by a fuel level sensor and represented by plot 345 is indicated to rise. As discussed with regard to FIG. 3A, the pressure plateau reached during the refueling event may be a function of the dispense rate (e.g. 10 gallons per minute). Thus, a refuel fill rate may be determined via the vehicle controller (e.g. 212), according to equation (1) discussed above at FIG. 3A. Briefly, a rate of change in fuel level in the tank over a predetermined time period may be multiplied by fuel tank capacity (in gallons) to indicate a fuel fill rate. By determining a fuel fill rate, a misfueling threshold 347 may be adjusted to near 10 InH2O, as discussed above. In other words, the misfueling threshold 347 may be adjusted as a function of fuel fill rate.

In the example refueling event 330 depicted in FIG. 3B, pressure in the fuel tank is above adjusted misfueling threshold 347, thus indicating that gasoline (or other fuel blend) is being added to the tank, and not diesel fuel. Thus, refueling may be allowed to proceed without automatically discontinuing the refueling event.

Between time t3 and t4, pressure in the fuel tank is indicated to abruptly rise. As discussed, an abrupt rise in fuel tank pressure may be due to fuel level in the fuel tank reaching a level near the capacity of the fuel tank, such that a fill limiting vent valve (FLVV) (e.g. 285) may be closed. With the FLVV closed, pressure in the tank may abruptly increase, until pressure reaches a level where the refueling dispenser is automatically induced to shut off the dispensing of fuel.

Thus, at time t4, pressure is indicated to reach a fuel tank pressure (e.g. 12 InH2O) at which point the refueling dispenser is triggered to shut off. With the refueling dispenser triggered to shut off at time t4, fuel level in the fuel tank reaches a plateau, indicated by plot 345. Subsequent to the refueling dispenser being shutoff, pressure in the fuel tank may return to atmospheric pressure (atm).

Figure 3C:
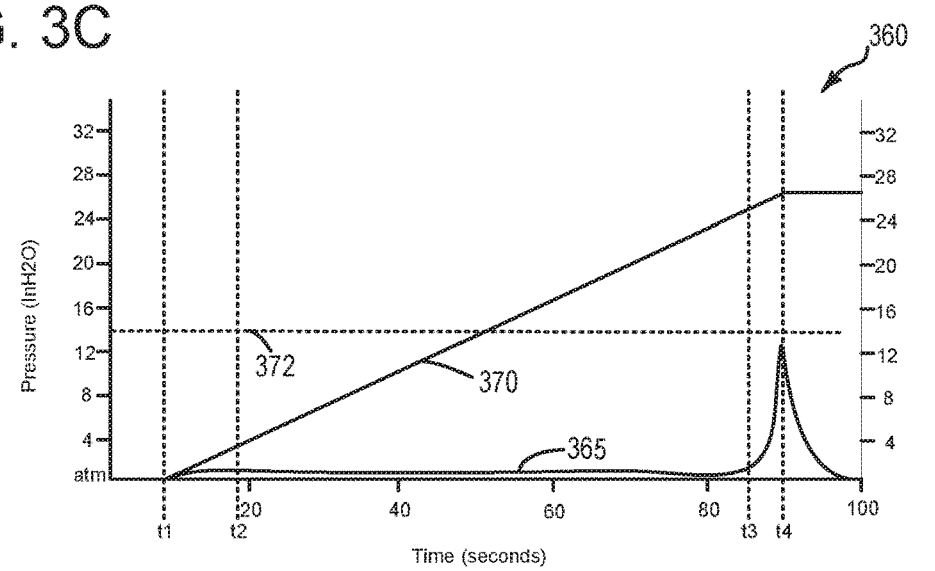
FIG. 3C schematically illustrates a fuel tank pressure profile during the addition of diesel fuel to a vehicle fuel tank.

Turning now to FIG. 3C, still another example refueling event 360 is graphically illustrated. It may be understood that the refueling event 360 comprises a fuel tank where diesel fuel is added to a tank configured to accept gasoline (or other fuel blend that does not include diesel fuel). More specifically, a pressure profile 365 of pressure in a vehicle fuel tank during a refueling event, is shown. Actual pressure in the fuel tank may be monitored via an FTPT, and a dispersed amount of fuel 370, may be indicated via a fuel level sensor. An x-axis of FIG. 3C depicts time in seconds, a first y-axis depicts pressure in the fuel tank (in InH2O), and a second y-axis depicts a volume of fuel dispensed, in gallons. As discussed above, a dispense rate of a refueling dispenser may vary depending on the particular refueling dispenser. Thus, in FIG. 3C, it may be understood that fuel is being dispersed at a rate of approximately 16 gallons per minute.

At time t1, fuel begins being dispensed into the tank, indicated by plot 370. However, unlike example refueling events depicted above with regard to FIG. 3A and FIG. 3B, between time t1 and t2, an abrupt pressure increase due to an initial flash event, is not indicated. A lack of an initial pressure increase due to an initial flash event, may be indicative of diesel fuel being dispensed into the fuel tank, rather than gasoline (or other fuel blend).

Between time t2 and t3, pressure in the fuel tank remains below 4 InH2O, although fuel is indicated to be being added to the tank. A fuel fill rate may be calculated according to equation (1) above. Based on the fuel fill rate, a misfueling threshold 372 may be set. For example, the fuel fill rate in FIG. 3C may be calculated at approximately 16 gallons per minute, as illustrated. With the fuel fill rate calculated, an expected fuel tank pressure may be determined, where the expected fuel tank pressure is based on the fuel fill rate and an expectation that the fuel being added to the tank is gasoline (or other fuel blend). The expected pressure may be used, as discussed above, to adjust the misfueling threshold 372.

Thus, with the misfueling threshold 372 adjusted, it may be indicated that the actual pressure indicated in the fuel tank during the refueling event is well-below the misfueling threshold 372, if the fuel being added to the fuel tank were gasoline (and not diesel fuel). As such, between time t2 and t3 it may be indicated that diesel fuel is being added to the fuel tank. As will be discussed below, in some examples, one or more valves in the fuel system (e.g. 218) and/or evaporative emissions system (e.g. 251) may be controlled in order to induce an active shutoff of the refueling dispenser, which may thus prevent additional diesel fuel from being added to the tank. However, in the example illustration depicted in FIG. 3C, for illustrative purposes, an active shutoff of the refueling dispense is not commanded. Instead, between time t3 and t4, pressure in the fuel tank rises as fuel level in the tank reaches the capacity of the fuel tank (e.g. 26 gallons), due to the FLVV closing responsive to the rising fuel level. As a result of the pressure build between time t3 and t4, the refueling dispenser may be shut off, as indicated by fuel level in the tank reaching a plateau, illustrated by plot 370. Subsequent to the refueling dispenser being shutoff, pressure in the fuel tank may return to atmospheric pressure (atm).

The example illustration depicted in FIG. 3C is intended to illustrate that when a fuel tank is filled with diesel fuel, a resulting pressure profile in the fuel tank during the refueling event is substantially different than a refueling event where gasoline (or other fuel blend) is added to the fuel tank. Thus, pressure in the fuel tank during refueling, where pressure is a function of fuel volatility and fuel fill rate, may be used to indicate whether a misfueling event is taking place. Furthermore, FIG. 3C illustrates that upon sealing the fuel tank (via a FLVV closing in the example case of FIG. 3C), pressure building in the fuel tank may shut off a refueling dispenser. Thus, if a misfueling event were detected during refueling, by actively closing a valve positioned in the fuel system or evaporative emissions to seal the fuel tank from atmosphere, an active shutoff of the refueling dispenser may be induced. Accordingly, further misfueling of the fuel tank by the addition of diesel fuel may be prevented, and the vehicle operator may be notified of the misfueling, prior to subsequent vehicle operation.

Turning now to FIG. 4, a high level flowchart for an example method 400 for determining whether conditions are met for conducting a misfueling diagnostic during a refueling event, is shown. More specifically, method 400 may be used to indicate whether a refueling event is requested, and if so, whether conditions are met for a misfueling diagnostic, herein additionally referred to as a volatility test diagnostic. Conditions being met may be based, at least in part, on an indication of an absence of undesired evaporative emissions in a vehicle fuel system (e.g. 218) and evaporative emissions system (e.g. 251). Such a procedure for indicating the presence or absence of undesired evaporative emissions is illustrated in FIG. 5. Responsive to an indication that conditions are met for conducting a misfueling diagnostic, the refueling event and misfueling diagnostic may be conducted according to the method depicted in FIG. 6. More specifically, responsive to a request for refueling the fuel tank, a canister vent valve (e.g. 297) and a fuel tank isolation valve (e.g. 252) (where included) may be commanded open or maintained open, and in a first condition, including an indication that a correct fuel type is being added to the fuel tank during refueling, the canister vent valve (and FTIV where included), may be maintained open until an indication that the refueling event is complete. In a second condition, including an indication that an incorrect fuel type is being added to the fuel tank during refueling, the canister vent valve (and/or FTIV) may be commanded closed to actively terminate the refueling.

Method 400 will be described with reference to the systems described herein and shown in FIGS. 1-2, though it should be understood that similar methods may be applied to other systems without departing from the scope of this disclosure. Method 400 may be carried out by a controller, such as controller 212 in FIG. 2, and may be stored at the controller as executable instructions in non-transitory memory. Instructions for carrying out method 400 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, such as fuel tank isolation valve (FTIV) (e.g. 252), canister vent valve (CVV) (e.g. 297), canister purge valve (CPV) (e.g. 261), etc., according to the methods depicted below.

Method 400 begins at 405, and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 410, method 400 may include indicating whether a refueling event is requested. For example, a refueling request may comprise a vehicle operator depression of a refueling button on a vehicle instrument panel in the vehicle (e.g., refueling button 197), or at a refueling door. In some examples, a refueling request may comprise a refueling operator requesting access to a fuel filler neck, for example, by attempting to open a refueling door, and/or attempting to remove a gas cap. Such examples are in no way meant to be limiting, and a refueling request may be indicated via any manner known in the art. If, at 410, a request for refueling is not indicated, method 400 may proceed to 415, and may include maintaining the vehicle fuel system and evaporative emissions system status. For example, components such as the FTIV, CVV, CPV, and refueling lock may be signaled by the controller to maintain their current conformation and/or activity. Method 400 may then end.

Returning to 410, if a request for refueling is indicated, method 400 may proceed to 420. At 420, method 400 may include determining whether conditions are met for conducting a misfueling diagnostic (also referred to herein as a volatility test diagnostic). Conditions being met for a misfueling diagnostic may include an indication that undesired evaporative emissions are not indicated in either the fuel system (e.g. 218) or evaporative emissions system (e.g. 251), for example. Such a method for conducting an evaporative emissions test diagnostic procedure is illustrated by the method 500 depicted at FIG. 5, which will be discussed in further detail below.

If conditions for conducting the misfueling diagnostic (also referred to herein as a volatility test) are met, method 400 may proceed to 430. At 430, method 400 may include conducting refueling of the vehicle and correspondingly conducting the misfueling diagnostic, according to the method illustrated in FIG. 6, which will be discussed in detail below. Alternatively, returning to 420, if it is indicated that conditions are not met for conducting the misfueling diagnostic, then method 400 may proceed to 425, and may include conducting the refueling event without additionally conducting the misfueling diagnostic.

Conducting the refueling event without concurrently conducting a misfueling diagnostic, may be carried out as follows. Responsive to a request for refueling, if the vehicle is equipped with a FTIV, the FTIV may be commanded open (and the CVV may additionally be commanded open or maintained open) such that the fuel tank may be depressurized. Depressurization of the fuel tank may be monitored via a fuel tank pressure transducer (e.g. 291), for example. Upon indication that the fuel tank is depressurized, a refueling lock may be commanded open, or may passively open, as discussed above, to allow the refueling operation to begin. Fuel may be added to the tank, and pressure in the fuel system, as well as fuel level in the fuel tank, may be monitored by the fuel tank pressure transducer (e.g. 291) and fuel level sensor (e.g. 234), respectively. If the tank is filled to capacity, a fill level vent valve (FLVV) (e.g. 285) may close, thus increasing pressure in the fuel tank such that an automatic shutoff of the refueling dispenser is initiated. Alternatively, refueling may be stopped at any point by a refueling dispenser operator. As such, the refueling event may be indicated to be complete responsive to one or more of at least the refueling dispenser being removed from the fuel filler neck, a fuel level plateau for a predetermined duration of time, pressure in the fuel tank reaching atmospheric pressure for a predetermined time, etc. When it is indicated that the refueling event is complete, the FTIV (if included) may be commanded closed to seal the fuel tank, and the CVV may be maintained open, or in some examples, may too be closed. In a case where an FTIV is not included, the CVV may in some examples be maintained open. In other examples where an FTIV is not included, the CVV may in some examples be commanded closed after the refueling event.

It may be understood that the above-described example scenario for refueling a fuel tank is well known in the art, and as such, a separate example method is not included for brevity. Thus, it may be understood that at step 425, any manner of conducting a refueling event on a vehicle, such as the vehicle described by the systems illustrated in FIGS. 1-2, may be performed, without departing from the scope of this disclosure.

As discussed above at step 420 of method 400, prior to conducting a refueling event and correspondingly conducting a misfueling diagnostic, it may be indicated whether the vehicle fuel system and evaporative emissions system are free from undesired evaporative emissions. Turning now to FIG. 5, an example method 500 for determining the presence or absence of undesired evaporative emissions in a vehicle fuel system and evaporative emissions system, is shown. More specifically, method 500 may be used to conduct an evaporative emissions test diagnostic on a vehicle fuel system and evaporative emissions system via the use of intake manifold vacuum to evacuate the fuel system and evaporative emissions system. Upon a vacuum-build in the fuel system and evaporative emissions system reaching a threshold that is negative with respect to atmospheric pressure, the fuel system and evaporative emissions system may be sealed, and subsequent pressure bleed-up may be monitored. The fuel system and evaporative emissions system may be indicated to be free from undesired evaporative emissions if pressure bleed-up is below a threshold pressure, or if a rate of pressure bleed-up is below a predetermined pressure bleed-up rate, for example. If the fuel system and evaporative emissions system are indicated to be free from undesired evaporative emissions, then at a subsequent refueling event, a misfueling diagnostic may be conducted during the refueling event.

Said another way, method 500 may include indicating a presence or an absence of undesired evaporative emissions in the fuel tank and evaporative emissions system prior to refueling the fuel tank. In such an example, indicating whether misfueling is occurring at a subsequent refueling operation is only determined responsive to the indicated absence of undesired evaporative emissions, and not under conditions where undesired evaporative emissions are indicated. In some examples, conducting the test for undesired evaporative emissions may include reducing pressure in the fuel tank and evaporative emissions system to a predetermined negative pressure threshold, and then sealing the fuel tank and evaporative emissions system from atmosphere responsive to pressure in the fuel tank and evaporative emissions system reaching the predetermined negative pressure threshold. Subsequently, the presence or absence of undesired evaporative emissions may be indicated responsive to a pressure bleedup greater than a predetermined bleedup pressure threshold, or responsive to pressure bleedup in the fuel tank and evaporative emissions system changing at a rate greater than a predetermined pressure bleedup threshold rate.

Method 500 will be described with reference to the systems described herein and shown in FIGS. 1-2, though it should be understood that similar methods may be applied to other systems without departing from the scope of this disclosure. Method 500 may be carried out by a controller, such as controller 212 in FIG. 2, and may be stored at the controller as executable instructions in non-transitory memory. Instructions for carrying out method 500 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, such as fuel tank isolation valve (FTIV) (e.g. 252), canister vent valve (CVV) (e.g. 297), canister purge valve (CPV) (e.g. 261), etc., according to the method depicted below.

Method 500 begins at 505 and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc. Continuing at 510, method 500 may include indicating whether conditions are met for an evaporative emissions test diagnostic procedure. For example, at 510, conditions being met for the evaporative emissions test diagnostic may include a fuel level between 15% and 85% of the capacity of the fuel tank, ambient temperature between 40-95° F., altitude less than 8000 feet, an indication that a fuel vapor canister (e.g. 222) is substantially free from fuel vapors, that the vehicle is in a steady state speed condition, that the engine is in a steady state load condition, an absence of fuel slosh, an engine coolant temperature (ECT) greater than 160° F., intake manifold vacuum greater than a threshold manifold vacuum, etc. In some examples, all of the conditions listed above may need to be met in order to indicate that conditions are met for conducting the evaporative emissions test. In other examples, one or more of the conditions listed above may need to be met in order for the evaporative emissions test diagnostic to be conducted.

If, at 510, vehicle operating conditions are such that conditions are not indicated to be met for conducting the evaporative emissions test diagnostic, method 500 may proceed to 515. At 515, method 500 may include maintaining the status of the vehicle fuel system and evaporative emission system. For example, components such as the FTIV, CVV, CPV, may be signaled by the controller to maintain their current conformation and/or activity. Method 500 may then end.

Alternatively, if conditions for conducting the evaporative emissions test diagnostic are indicated to be met at 510, method 500 may proceed to 520. At 520, method 500 may include commanding open the CPV and the FTIV, and commanding closed the CVV. More specifically, a command may be sent from the vehicle controller (e.g. 212) to the CPV commanding the CPV to open, another command may be sent from the vehicle controller to the FTIV commanding the FTIV to open, and yet another command may be sent from the vehicle controller to the CVV commanding the CVV to close. By commanding open the CPV, and further commanding open the FTIV, vacuum from the intake manifold may be applied to the vehicle fuel system (e.g. 218) and vehicle evaporative emissions system (e.g. 251). With the CVV closed, the vacuum applied to the fuel system and evaporative emissions system may build, until a predetermined negative pressure threshold may be reached. In some examples, a vehicle may not include a FTIV. In such an example, the CPV may be commanded open and the CVV may be commanded closed, such that intake manifold vacuum may be applied to the fuel system and evaporative emissions system, as discussed.

Accordingly, at 525, method 500 may include monitoring pressure in the fuel system and evaporative emissions system while vacuum from the intake manifold is communicated to the fuel system and evaporative emissions system. Pressure may be monitored, for example, via one or more fuel tank pressure sensor(s) (e.g. 291).

Continuing to 530, method 500 may include indicating whether pressure in the fuel system and evaporative emissions system has reached the predetermined negative pressure threshold. If, at 530, it is indicated that pressure in the fuel system and evaporative emissions system is not below the negative pressure threshold, method 500 may proceed to 535. At 535, it may be indicated whether a pressure plateau has been reached during the evacuating of the fuel system and evaporative emissions system. For example, a pressure plateau may include pressure in the fuel system and evaporative emissions system that reaches a particular pressure that is positive with respect to the negative pressure threshold, and which does not further continue to drop in the direction of the negative pressure threshold. In some examples, a pressure plateau may be indicated if pressure in the fuel system and evaporative emissions system reaches a level that is positive with respect to the negative pressure threshold, and remains at that pressure for a predetermined duration. If, at 535, a pressure plateau is not indicated, then method 500 may return to 525, and may include continuing to monitor pressure in the fuel system and evaporative emission system. However, if, at 535, a pressure plateau is indicated, method 500 may proceed to 540.

At 540, method 500 may include indicating the presence of undesired evaporative emissions. For example, because intake manifold vacuum was communicated to the fuel system and evaporative emissions system, and because the vacuum was unable to reduce pressure in the fuel system and evaporative emissions system to the predetermined negative pressure threshold, it is likely that undesired evaporative emissions are present, stemming from the fuel system and/or evaporative emissions system. Thus, at 540, undesired evaporative emissions may be indicated, and such a result may be stored at the controller, for example.

Responsive to the indication of the presence of undesired evaporative emissions, method 500 may proceed to 545. At 545, method 500 may include commanding closed the CPV, commanding open the CVV, and commanding closed the FTIV. In an example where the vehicle does not include a FTIV, then only the CVV may be commanded open, and the CPV commanded closed. In some examples, after closing the CPV, the CVV may be next commanded open, thus allowing pressure in the fuel system an evaporative emissions system to return to atmospheric pressure, prior to commanding closed the FTIV.

Proceeding to 550, method 500 may include updating the status of the fuel system and evaporative emissions system. For example, undesired evaporative emissions may be indicated, and such an indication may include illuminating a malfunction indicator light (MIL) on the vehicle dash, alerting an operator of the vehicle of the need to service the vehicle. Furthermore, at 550, updating the status of the fuel system and evaporative emissions system may include indicating that conditions are not met for conducting a misfueling diagnostic during a subsequent refueling event. Such an indication may be stored at the vehicle controller, for example. Method 500 may then end.

Returning to 530, if pressure in the fuel system and evaporative emissions system is indicated to reach the predetermined negative pressure threshold, method 500 may proceed to 555. At 555, method 500 may include sealing the fuel system and evaporative emissions system. Sealing the fuel system and evaporative emissions system at step 555 may include commanding closed the CPV, and commanding closed the CVV. However, if included, the FTIV may be maintained open. By maintaining open the FTIV, with the CVV and CPV closed, the fuel system may be in fluid communication with the evaporative emissions system, where both the fuel system and evaporative emissions system are sealed from atmosphere. As discussed above, commanding closed the CPV and CVV may include the controller sending signals to the CPV and CVV to close.

Proceeding to 560, method 500 may include monitoring pressure in the fuel system and evaporative emissions system. As discussed above, monitoring pressure in the fuel system and evaporative emissions system may be conducted via one or more fuel tank pressure transducer(s) (FTPT) (e.g. 291), for example. Pressure may be monitored for a predetermined duration, in some examples. The predetermined duration may, in some examples, be related to a time duration where, in the absence of undesired evaporative emissions in the fuel system and evaporative emissions system, pressure may be expected to remain below a predetermined pressure threshold. Accordingly, proceeding to 565, method 500 may include indicating whether pressure bleedup in the fuel system and evaporative emissions system is indicated to be greater than a predetermined bleedup pressure threshold, or whether pressure bleedup in the fuel system and evaporative emissions system is changing greater than a predetermined pressure bleedup threshold rate. For example, the predetermined bleedup pressure threshold may include a threshold that is positive with respect to the negative pressure threshold discussed above, but which is still negative with respect to atmospheric pressure. The predetermined bleedup pressure threshold may be related to an orifice size at which undesired evaporative emissions may be escaping from the fuel system and evaporative emissions system. For example, if the pressure bleedup threshold is reached subsequent to sealing the fuel system and evaporative emissions system at step 555, then it may be indicated that undesired evaporative emissions may be escaping from an orifice of at least a predetermined diameter (e.g. 0.4", or 0.2"). Similarly, a pressure bleedup rate that is greater than the predetermined pressure bleedup threshold rate may be indicative of undesired evaporative emissions escaping from an orifice of at least a predetermined diameter (e.g. 0.4", or 0.2"). Such examples are illustrative, and as such, are not meant to be limiting.

If, at 565, pressure bleedup is indicated to be greater than the pressure bleedup threshold, or if a pressure bleedup rate is greater than the predetermined pressure bleedup threshold rate, then method 500 may proceed to 540. At 540, as discussed above, method 500 may include indicating the presence of undesired evaporative emissions. Such an indication may be stored at the controller, for example. Proceeding to 545, method 500 may include commanding closed the CPV, commanding open the CVV, and commanding closed the FTIV. In an example where the vehicle does not include a FTIV, then only the CVV may be commanded open, and the CPV commanded closed. In some examples, after closing the CPV, the CVV may be next commanded open, thus allowing pressure in the fuel system an evaporative emissions system to return to atmospheric pressure, prior to commanding closed the FTIV (where included).

Proceeding to 550, method 500 may include updating the status of the fuel system and evaporative emissions system. For example, undesired evaporative emissions may be indicated, and such an indication may include illuminating a malfunction indicator light (MIL) on the vehicle dash, alerting an operator of the vehicle of the need to service the vehicle. Furthermore, at 550, updating the status of the fuel system and evaporative emissions system may include indicating that conditions are not met for conducting a refueling event, where the refueling event includes conducting a misfueling diagnostic. Such an indication may be stored at the vehicle controller, for example. Method 500 may then end.

Returning to 565, if pressure bleedup as monitored in the vehicle fuel system and evaporative emissions system remains below (e.g. negative with respect to) the predetermined bleedup pressure threshold, or if the pressure bleedup rate is indicated to be lower than the predetermined pressure bleedup threshold rate, method 500 may proceed to 570. At 570, method 500 may include indicating an absence of undesired evaporative emissions stemming from the fuel system and evaporative emissions system. Such an indication may be stored at the controller, for example. Responsive to indicating the absence of undesired evaporative emissions, method 500 may proceed to 545, and, as discussed, may include commanding closed the CPV, commanding open the CVV, and commanding closed the FTIV. In an example where the vehicle does not include a FTIV, then only the CVV may be commanded open, and the CPV commanded closed. In some examples, after closing the CPV, the CVV may be next commanded open, thus allowing pressure in the fuel system an evaporative emissions system to return to atmospheric pressure, prior to commanding closed the FTIV (where included).

Proceeding to 550, method 500 may include updating fuel system and evaporative emissions system status. For example, updating fuel system and evaporative emissions system status may include indicating that conditions are met for a misfueling diagnostic, at a subsequent refueling event. Such an indication may be stored at the controller, in an example. Method 500 may then end.

While an evaporative emissions test diagnostic procedure discussed at FIG. 5 includes an engine-on condition where the fuel system and evaporative emissions system are evacuated via engine intake manifold vacuum, such an example is illustrative and is not meant to be limiting. For example, any method known in the art may be utilized to determine the presence or absence of undesired evaporative emissions at step 420 of FIG. 4. For brevity, all potential options for conducting evaporative emissions test diagnostics are not reiterated herein. However, such examples may include the use of an onboard pump to pressurize or evacuate the fuel system and evaporative emissions system, such that an assessment of the presence or absence of undesired evaporative emissions may be determined. In another example, responsive to an engine-off event, engine-off natural vacuum (EONV) techniques may be utilized to pressurize and/or evacuate the vehicle fuel system and evaporative emissions system, such that an assessment of the presence or absence of undesired evaporative emissions may be determined. Briefly, for an EONV test, a fuel system (and in some examples an evaporative emissions system) may be isolated at an engine-off event. The pressure in such a fuel system (and evaporative emissions system) may increase if the tank is heated further (e.g., from hot exhaust or a hot parking surface) as liquid fuel vaporizes. Pressure increase above a positive pressure threshold may indicate the absence of undesired evaporative emissions. Alternatively, if the positive pressure threshold is not reached, as the fuel tank cools down, a vacuum may be generated therein as fuel vapors condense to liquid fuel. In such an example, vacuum generation may be monitored and undesired evaporative emissions may be identified based on expected vacuum development or expected rates of vacuum development. In any case, an absence of undesired evaporative emissions in the vehicle fuel system and evaporative emissions system may thus represent a condition where a misfueling diagnostic may be conducted.

Figure 6:
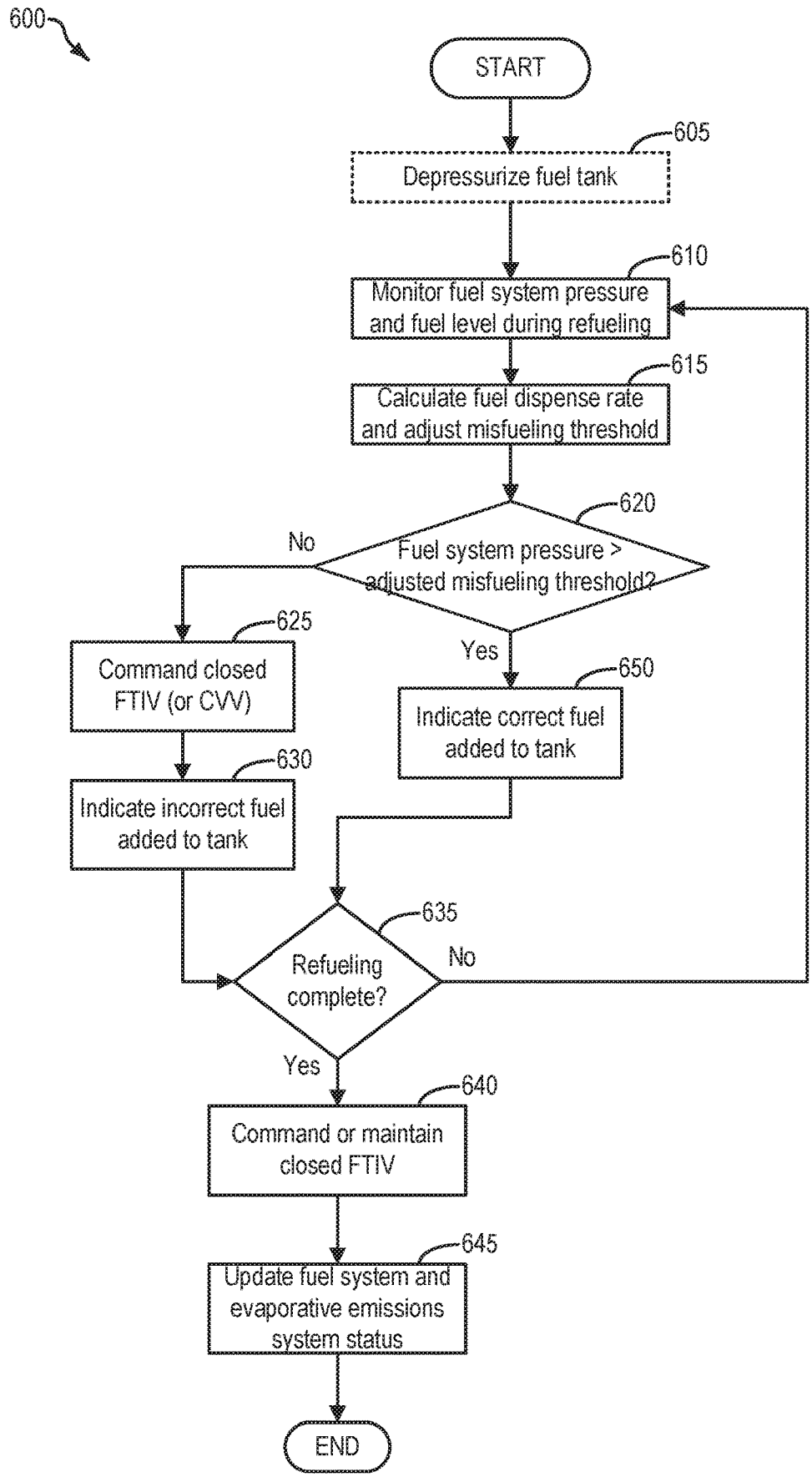
FIG. 6 shows a high-level flowchart for an example method for conducting a misfueling diagnostic during refueling a vehicle fuel tank.

Accordingly, returning to step 420 of method 400 depicted at FIG. 4, if conditions are met for the misfueling diagnostic, method 400 may proceed to step 430, as discussed above, and may include conducting the refueling operation and misfueling diagnostic test according to the method depicted in FIG. 6.

Turning now to FIG. 6, a high-level example method 600 for conducting a refueling operation and corresponding misfueling diagnostic test, is shown. More specifically, method 600 may be used to conduct a typical refueling operation, while additionally determining whether or not the wrong kind (incorrect type) of fuel is being added to the fuel tank. For example, method 600 may be used to indicate diesel fuel is being added to a fuel tank, where the fuel tank and vehicle are configured for gasoline (or other fuel blend). Responsive to an indication that a misfueling event is occurring, method 600 may be used to actively discontinue the refueling operation, such that further addition of the incorrect fuel type is discouraged. Said another way, for a vehicle configured to run on gasoline or other fuel blend that does not include diesel fuel, misfueling may be indicated responsive to actual pressure in the fuel tank being below adjusted misfueling pressure threshold(s), wherein indicating misfueling includes addition of diesel fuel to the fuel tank.

As one example, method 600 may include a controller (e.g. 212) configured to monitor actual pressure in the fuel tank during refueling, and monitor a fuel fill level in the fuel tank. A fuel fill level change over a predetermined time period may thus be indicated. Subsequently, a fuel fill rate may be determined, the fuel fill rate based on the fuel fill level change over the predetermined time period and a capacity of the fuel tank. An expected pressure in the fuel tank may thus be indicated, the expected pressure a function of the determined fuel fill rate. At least one misfueling pressure threshold may thus be adjusted, where the at least one misfueling pressure threshold may be increased responsive to an increase in the fuel fill rate, and may be decreased responsive to a decrease in fuel fill rate. As such, it may be indicated as to whether the incorrect fuel type is being added to the fuel tank during refueling based on whether the actual pressure in the fuel tank is above or below the at least one misfueling pressure threshold.

Method 600 will be described with reference to the systems described herein and shown in FIGS. 1-2, though it should be understood that similar methods may be applied to other systems without departing from the scope of this disclosure. Method 600 may be carried out by a controller, such as controller 212 in FIG. 2, and may be stored at the controller as executable instructions in non-transitory memory. Instructions for carrying out method 600 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, such as fuel tank isolation valve (FTIV) (e.g. 252), canister vent valve (CVV) (e.g. 297), canister purge valve (CPV) (e.g. 261), etc., according to the method depicted below.

Method 600 continues from method 400, and includes depressurizing the fuel tank at step 605, responsive to an indication that a refueling event is requested, and further responsive to an indication that conditions are met for conducting a misfueling test diagnostic. Accordingly, at step 605, method 600 may include depressurizing the fuel tank. For example, the controller (e.g. 212) may open FTIV (e.g. 252) and open or maintain open a vent path between the fuel vapor canister and atmosphere (e.g. open CVV), while maintaining the CPV (e.g. 261) closed, to depressurize the fuel tank before enabling fuel to be added therein. Thus, it may be understood that the FTIV may control a flow of air and fuel vapor in a conduit coupling the fuel tank to the fuel vapor storage canister, and the CVV may control flow of air and fuel vapor in a vent line coupling the fuel vapor storage canister to atmosphere. The FTIV may be opened in a manner to depressurize the fuel tank at a predetermined rate, so as to prevent rapid depressurization. For example, FLVV (e.g. 285) and GVV (e.g. 283) may cork shut responsive to rapid depressurization. By commanding open the FTIV, the fuel tank may be selectively coupled to adsorbent material contained in a fuel vapor canister positioned in an evaporative emissions system of the vehicle. A refueling lock (e.g., 245), may be maintained locked until the fuel tank pressure decreases to a threshold pressure (e.g., atmospheric pressure), and then commanded to unlock, thus allowing access to the fuel filler neck only following fuel tank depressurization. In some examples, the refueling lock may be commanded to unlock via the controller sending a signal to the refueling lock, thus actuating open the refueling lock. In another example, the refueling lock may be opened via mechanical means, responsive to fuel tank depressurization.

Step 605 is illustrated as a dashed box in order to indicate that step 605 may not be carried out in a vehicle that does not include a FTIV. In such an example where a vehicle does not include an FTIV, the CVV (e.g. 297) may be typically maintained open, except for during test diagnostic procedures to identify the presence or absence of undesired evaporative emissions. Thus, in an example where a vehicle is not equipped with an FTIV, the fuel tank may typically be at or near atmospheric pressure, and thus a depressurization procedure prior to refueling may not be conducted.

Proceeding to step 610, method 600 may include monitoring actual pressure in the fuel system, and may further include monitoring a fuel fill level in the fuel tank, during conducting the refueling event. As discussed above, monitoring pressure in the fuel system may be carried out by a fuel tank pressure transducer (e.g. 291), and monitoring a fuel fill level may be conducted via a fuel fill level sensor (e.g. 234).

Continuing to 615, method 600 may include calculating a fuel dispense rate. As discussed above, a fuel dispense rate (also referred to herein as a refuel fill rate, or fuel fill rate) may be determined via the vehicle controller, and may be based on an amount of fuel added to the tank (e.g. fuel fill level change over a predetermined time), and a capacity of the fuel tank. With knowledge of an amount of fuel added to the tank at a particular time, and with a further knowledge of a capacity of the fuel tank, a fuel dispense rate may be calculated according to equation (1) as discussed above. Briefly, a rate of change in fuel level in the fuel tank may be multiplied by fuel tank capacity, to indicate a fuel fill rate (dispense rate). By determining a fuel fill rate, a misfueling threshold for determining whether gasoline or diesel fuel is being added to the tank, may be adjusted. For example, responsive to a particular fuel fill rate, a certain pressure may be expected to develop in the fuel tank during the refueling event. Such information may be stored at the controller in a lookup table, for example, where the information contained in the lookup table may comprise fuel fill rate, and expected pressure builds. Thus, responsive to an indication of fuel fill rate, determined at step 615, a misfueling threshold may be adjusted to be near the expected fuel tank pressure. As discussed above, in some examples, the misfueling threshold may be adjusted to be one, two, or three InH2O below the expected pressure in the fuel system. In other examples, the misfueling threshold may be set at greater than three InH2O, or less than one InH20, below the expected pressure in the fuel system, the expected pressure a function of the fuel fill rate (dispense rate).

With the misfueling threshold adjusted, method 600 may proceed to 620. At 620, method 600 may include indicating whether a measured pressure in the fuel system is greater than the adjusted misfueling threshold. If, at 620, it is indicated that pressure in the fuel system is not above the adjusted misfueling threshold (e.g. the fuel system pressure is below the adjusted misfueling threshold), method 600 may proceed to 625. At 625, method 600 may include commanding closed the FTIV (when included). At 625, if the FTIV is not included in the vehicle system, then the CVV may be commanded closed. In either case, the controller may send a signal to the FTIV, or to the CVV, commanding either the FTIV, or CVV to a closed state. By commanding closed the FTIV (where included) or CVV, the fuel tank may be sealed from atmosphere. By sealing the fuel tank from atmosphere while fuel is being dispersed into the fuel tank, pressure in the fuel tank may rapidly build, which may trigger a shutoff of the refueling dispenser being utilized to add fuel to the fuel tank. Triggering a shutoff of the refueling dispenser may thus prevent additional fuel from being added to the fuel tank. In a case where diesel fuel is being added to a tank and vehicle configured for gasoline (or other fuel blend), discontinuing the addition of diesel fuel may result in a reduction in complications stemming from the addition of the incorrect fuel type to the fuel tank. Furthermore, with the fuel system sealed from atmosphere via the closing of the FTIV or CVV, any further attempts to add fuel to the fuel tank may be rapidly discontinued, thus a vehicle operator may be alerted to the fact that a misfueling event has occurred, and that no further attempts to refuel the vehicle should be undertaken. Said another way, in a first condition, including an indication that a correct fuel type is being added to the fuel tank during refueling, maintain the canister vent valve (and FTIV where included) open until an indication that the refueling is complete; and in a second condition, including an indication that an incorrect fuel type is being added to the fuel tank during refueling, command closed the canister vent valve (or FTIV where included) to actively terminate the refueling.

Proceeding to 630, method 600 may include indicating that the incorrect fuel has been added to the fuel tank. Such an indication may be stored at the controller, for example. Proceeding to 635, method 600 may include indicating whether the refueling event is complete. For example, completion of refueling at 635 may be indicated when the fuel level has plateaued for a predetermined duration of time. Indicating whether the refueling event is complete may further include an indication that a refueling nozzle has been removed from the fuel filler neck, replacement of a fuel cap, closing of a refueling door, etc. In the case where the FTIV or CVV was closed in order to prevent further addition of fuel, any further attempts to refuel may be rapidly terminated, as discussed above. As such, if at 635 it is indicated that the refueling event is complete, method 600 may proceed to 640. At 640, method 600 may include maintaining closed the FTIV, if the FTIV were commanded closed at step 625 of method 600. Alternatively, if the CVV was commanded closed at step 625 of method 600, then the CVV may be commanded open. Such an example may include a condition where the vehicle does not comprise a FTIV, and where the CVV was closed in order to prevent further addition of fuel to the fuel tank. By commanding open the CVV at step 640, the fuel tank may be fluidically coupled to the evaporative emissions system, wherein fuel vapors from the fuel tank may be routed to the fuel vapor storage canister for storage, prior to exiting to atmosphere via the open CVV. However, because the vehicle was misfueled, in some examples the CVV may be maintained closed at step 640 in the case where the vehicle does not include a FTIV.

Proceeding to 645, method 600 may include updating the vehicle fuel system and evaporative emissions system status. For example, updating the fuel system and evaporative emissions system status may include illuminating a malfunction indicator light (MIL) on the dash, alerting the vehicle operator of the misfueling event, and providing an indication that the vehicle needs to be serviced. For example, by stopping the addition of diesel fuel into the fuel tank and alerting the vehicle operator of the misfueling event, subsequent driving of the vehicle after the misfueling event may be prevented. Method 600 may then end.

Returning to step 620, if, during the refueling event, fuel system pressure is indicated to be above the adjusted misfueling threshold, method 600 may proceed to 650. At 650, method 600 may include indicating that the correct fuel is being added to the fuel tank. For example, in a case where the vehicle is configured for gasoline (or other fuel blend), it may be indicated that gasoline (or other fuel blend) is being added to the fuel tank. Because the correct fuel is being added to the fuel tank, no additional action may be taken during the refueling event.

Proceeding to 635, method 600 may include indicating whether the refueling event is complete. As discussed above, completion of refueling may be indicated when fuel level in the tank has plateaued for a predetermined duration of time, responsive to an indication that a refueling nozzle has been removed from the fuel filler neck, responsive to an indication that a fuel cap has been replaced, that a refueling door has been closed, etc.

Proceeding to 640, method 600 may include commanding closed the FTIV to seal the fuel tank. In a case where the vehicle is not equipped with a FTIV, and where the CVV was maintained open during the refueling event, the CVV may be maintained open at step 640. As discussed above, by commanding open the CVV at step 640, the fuel tank may be fluidically coupled to the evaporative emissions system, wherein fuel vapors from the fuel tank may be routed to the fuel vapor storage canister for storage, prior to exiting to atmosphere via the open CVV.

Continuing to 645, method 600 may include updating the vehicle fuel system and evaporative emissions system status. For example, a level of fuel in the fuel tank may be updated and displayed on the vehicle dash, responsive to the recent refueling event. Method 600 may then end.

Turning now to FIG. 7, an example timeline 700 is shown for conducting an evaporative emissions test diagnostic on a vehicle fuel system and evaporative emissions system, according to the methods described herein and with reference to FIG. 5, and as applied to the systems described herein and with reference to FIGS. 1-2. Timeline 700 includes plot 705, indicating whether the vehicle engine is in an on state, or an off state, over time. Timeline 700 further includes plot 710, indicating whether conditions are met for an evaporative emissions system test diagnostic procedure, over time. Timeline 700 further includes plots 715, 720, and 725, indicating whether a canister purge valve (CPV) (e.g. 261) is open or closed, whether a fuel tank isolation valve (FTIV) (e.g. 252) is open or closed, and whether a canister vent valve (CVV) (e.g. 297) is open or closed, respectively, over time. Timeline 700 further includes plot 730, indicating pressure in the fuel system and evaporative emissions system, over time. Pressure in the fuel system and evaporative emissions system may be at atmospheric pressure (Atm.), or may be positive (+), or negative (−), with respect to atmosphere. Line 731 represents a predetermined negative pressure threshold, which, if reached during evacuating the fuel system and evaporative emissions system, may enable sealing of the fuel system and evaporative emissions system for conducting a pressure bleedup phase of the evaporative emissions test diagnostic procedure. Accordingly, line 732 represents a predetermined bleedup pressure threshold, where, if reached, may indicate the presence of undesired evaporative emissions. As such, timeline 700 further includes plot 735, indicating either the presence (yes), or absence (no), of undesired evaporative emissions in the fuel system and evaporative emissions system, over time.

At time t0, the vehicle is in operation and the engine is on, indicated by plot 705. For example, an engine-on condition may include a condition where fuel and spark are being provided to the engine for combustion. However, at time t0, conditions are not met for an evaporative emissions test diagnostic procedure, indicated by plot 710. As such, the CPV is closed, indicated by plot 715, the FTIV is closed, indicated by plot 720, and the CVV is open, indicated by plot 725. Because the FTIV is closed, thus sealing the fuel tank from atmosphere, and with the engine combusting, pressure in the fuel system is slightly above atmospheric pressure at time t0. Furthermore, undesired evaporative emissions are not indicated at time t0, illustrated by plot 735.

At time t1, conditions are indicated to be met for an evaporative emissions test diagnostic procedure. As discussed above, conditions being met for an evaporative emissions test diagnostic procedure while the vehicle is in operation and the engine is combusting may include one or more of a fuel level between 15% and 85% of the capacity of the fuel tank, ambient temperature between 40-95° F., altitude less than 8000 feet, an indication that a fuel vapor canister (e.g. 222) is substantially free from fuel vapors, that the vehicle is in a steady state speed condition, that the engine is in a steady state load condition, an absence of fuel slosh, an engine coolant temperature (ECT) greater than 160° F., intake manifold vacuum greater than a threshold manifold vacuum, etc. As conditions are met for conducting an evaporative emissions test diagnostic procedure at time t1, at time t2 the CVV is commanded closed, the FTIV is commanded open, and the CPV is commanded open. By commanding open the FTIV, the fuel system may be fluidically coupled to the evaporative emissions system. Furthermore, by commanding closed the CVV, the fuel system and evaporative emissions system may be sealed from atmosphere. Still further, by commanding open the CPV, the fuel system and evaporative emissions system may be fluidically coupled to an intake manifold of the vehicle. Thus, intake manifold vacuum may be applied to the vehicle fuel system and evaporative emissions system.

With the intake manifold vacuum communicated to the fuel system and evaporative emissions system at time t2, between time t2 and t3, pressure in the fuel system and evaporative emissions system begins to become negative with respect to atmospheric pressure. Pressure in the fuel system and evaporative emissions system may be monitored, for example, via a fuel tank pressure transducer (FTPT) (e.g. 291). At time t3, pressure in the fuel system reaches the predetermined negative pressure threshold, represented by plot 731. With pressure in the fuel system and evaporative emissions system having reached the predetermined negative pressure threshold at time t3, a pressure bleedup phase of the evaporative emissions test diagnostic procedure may be conducted.

Accordingly, at time t3, the CPV is commanded closed, indicated by plot 715. By closing the CPV, the vehicle fuel system and evaporative emissions system may be sealed from engine intake. Furthermore, the CVV is maintained closed, while the FTIV is maintained open. Thus, with the CVV closed and the FTIV open, the fuel system and evaporative emissions system are fluidically coupled, and are further sealed from atmosphere. As such, pressure bleedup in the fuel system and evaporative emissions system may be monitored.

Thus, pressure in the fuel system and evaporative emissions system is monitored between time t3 and time t4. However, pressure in the fuel system and evaporative emissions system remains below the predetermined bleedup pressure threshold. As such, undesired evaporative emissions are not indicated in the fuel system and evaporative emissions system, indicated by plot 735. In some examples, pressure in the fuel system and evaporative emissions system may be monitored during the pressure bleedup phase for a predetermined duration. As such, it may be understood that the predetermined duration may comprise a time duration between time t3 and time t4. As the predetermined time duration ends at time t4, and because pressure remained below the predetermined bleedup pressure threshold between time t3 to time t4, undesired evaporative emissions are not indicated.

Upon expiration of the predetermined time duration, where pressure in the fuel system and evaporative emissions system remained below the predetermined bleedup pressure threshold, the CVV may be commanded open. However, the FTIV may be maintained closed. Furthermore, as the predetermined time duration expired at time t4, conditions are no longer indicated to be met for conducting the evaporative emissions test diagnostic procedure. In other words, it may be indicated that an evaporative emissions test diagnostic procedure was conducted, and that no undesired evaporative emissions are indicated. Such an indication may be stored at the controller, for example.

Between time t4 and time t5, with the CVV open and the FTIV maintained open, pressure in the fuel system and evaporative emissions system returns to atmospheric pressure. Upon reaching atmospheric pressure at time t5, the FTIV is commanded closed, indicated by plot 720. By commanding closed the FTIV, the fuel system may be sealed from atmosphere. Between time t5 and t6, with the evaporative emissions test diagnostic procedure completed, the vehicle continues operation, with the engine combusting. By conducting an evaporative emissions test diagnostic on the vehicle fuel system and evaporative emissions system, it may be indicated as to whether a misfueling test diagnostic procedure (also referred to herein as a volatility test) may be conducted at a subsequent refueling operation, as discussed above, and which will be further discussed below. For example, an absence of undesired evaporative emissions may represent at least one entry condition that needs be satisfied in order to conduct the misfueling test diagnostic.

Turning now to FIG. 8, an example timeline 800 is shown for conducting a refueling event and correspondingly conducting a misfueling test diagnostic procedure (volatility test), according to the methods depicted herein and shown in FIGS. 4-6, and as applied to the systems described herein and with reference to FIGS. 1-3. Timeline 800 includes plot 805, indicating whether refueling is requested, over time. Timeline 800 further includes plot 810, indicating whether conditions are met for conducting a misfueling test diagnostic procedure (volatility test), over time. Timeline 800 further includes plot 815, indicating a fuel level in the fuel tank, over time. For example, a fuel level sensor (e.g. 234) located in the fuel tank (e.g. 220) may provide an indication of the fuel level (fuel level input, or FLI), to the vehicle controller (e.g. 212). Timeline 800 further includes plot 820, indicating pressure in the vehicle fuel system, over time. Pressure may be monitored, for example, via one or more fuel tank pressure transducers (FTPT) (e.g. 291). Pressure in the fuel system may be positive (+) or negative (−) with respect to atmospheric pressure (Atm.). Line 821 represents an adjusted misfueling threshold, where if, during refueling, pressure in the fuel tank does not reach the adjusted misfueling threshold, then it may be indicated that misfueling may have occurred. Timeline 800 further includes plot 825, indicating whether a fuel tank isolation valve (FTIV) (e.g. 252) is open or closed, over time. Timeline 800 further includes plot 830, indicating whether a canister vent valve (CVV) (e.g. 297) is open, or closed, over time. Timeline 800 further includes plot 835, indicating a fuel dispense rate from a fuel dispenser nozzle, for example. In this example timeline 800, fuel dispense rate may either be off, or may be at a maximum (max) level for the particular refueling dispenser nozzle. Timeline 800 further includes plot 840, indicating whether misfueling is detected, over time.

At time t0, while not explicitly illustrated, it may be understood that the vehicle has come to a stop at a gas station, with the intent to refuel the vehicle. However, at time t0, refueling is not yet requested, indicated by plot 805. As refueling is not requested, test conditions for conducting a misfueling test diagnostic are not indicated to be met, illustrated by plot 810. Thus, misfueling is not indicated, illustrated by plot 840, and fuel dispense rate of a fuel dispenser nozzle, is indicated to be in an off-state. Fuel level in the vehicle fuel tank is indicated to be near empty, illustrated by plot 815. Furthermore, the FTIV is closed, and the CVV is open, indicated by plots 825 and 830, respectively. With the FTIV closed, thus sealing the fuel tank from atmosphere, pressure in the fuel system is indicated to be slightly above atmospheric pressure.

At time t1, a request for refueling is indicated. As discussed above, a request for refueling may include a vehicle operator depressing a refueling button on a vehicle instrument panel in the vehicle (e.g. refueling button 197), or at a refueling door. In some examples, a refueling request may comprise a refueling operator requesting access to a fuel filler neck, for example, by attempting to open a refueling door, and/or attempting to remove a gas cap, etc.

With refueling requested at time t1, it is further indicated that conditions are met for conducting a volatility test (misfueling test diagnostic). As discussed above, conditions being met for a misfueling diagnostic may include an indication that undesired evaporative emissions are not indicated in either the fuel system (e.g. 218), or evaporative emissions system (e.g. 251), for example.

Still further, as refueling is requested, the vehicle FTIV is commanded open, indicated by plot 825. With the FTIV commanded open, pressure in the fuel tank returns to atmospheric pressure between time t1 and t2. With the fuel tank thus depressurized at time t2, refueling is indicated to commence, represented by plot 835. More specifically, fuel is indicated to be dispensed from a refueling dispenser nozzle at a maximum rate for such a dispenser nozzle. Accordingly, between time t2 and t3, fuel level in the fuel tank is indicated to rise, illustrated by plot 815.

As discussed above, pressure in the fuel system during refueling the fuel tank may be a function of fuel dispense rate, where the fuel being dispensed is gasoline (or other fuel blend). Accordingly, while fuel is being added to the tank between time t2 and t3, a refueling rate (dispense rate) may be determined via the vehicle controller, based on an amount of fuel added to the tank over a particular time period, and a capacity of the fuel tank being refueled, where the capacity may be programmed into the vehicle controller memory, for example. Specifically, the vehicle controller may calculate the fuel dispense rate by multiplying a rate of change in fuel level in the tank by fuel tank capacity, as discussed above with regard to equation (1).

With the dispense rate calculated, a misfueling threshold may be correspondingly adjusted. For example, the higher the dispense rate, the higher the pressure in the fuel tank may be expected to be if gasoline (or other fuel blend other than diesel fuel) is being added to the tank. Alternatively, the lower the dispense rate, the lower the pressure in the fuel tank may be expected to be if gasoline (or other fuel blend other than diesel fuel) is being added to the tank. Responsive to determining the fuel dispense rate then, an expected pressure in the fuel tank may be indicated. Such an indication may be provided via a lookup table stored at the vehicle controller, for example, where the lookup table includes expected fuel tank pressure as a function of fuel dispense rate. The expected pressure may thus be used to adjust a misfueling threshold, as a function of the fuel dispense rate. Accordingly, in example timeline 800, an adjusted misfueling threshold is represented by line 821. Thus, if the misfueling threshold is reached during the refueling event, then it may be indicated that no misfueling occurred. However, if the misfueling threshold is not reached during the refueling event, it may be indicated that misfueling has occurred. As illustrated in timeline 800, pressure in the fuel system remains below the adjusted misfueling threshold, and as such, at time t3, misfueling is indicated, illustrated by plot 840. Furthermore, an initial pressure increase upon commencing refueling the tank at time t2 was not observed. In some examples, misfueling may be indicated further responsive to an indication of lack of initial pressure increase upon commencing refueling.

As misfueling is detected at time t3, the FTIV is commanded closed, illustrated by plot 825. Because misfueling is detected, conditions are no longer indicated to be met for conducting the volatility test (misfueling test diagnostic), illustrated by plot 810. By closing the FTIV, thus sealing the fuel system from atmosphere, pressure may rapidly rise in the fuel tank. Accordingly, between time t3 and t4, pressure in the fuel system rapidly is indicated to rise, until a peak pressure is reached at time t4. When pressure in the fuel tank reaches a particular level (e.g. 12 InH2O), which may be understood to be the pressure indicated at the peak of plot 820, the fuel dispenser may be triggered to shutoff, responsive to the pressure increase. Because the FTIV is utilized to seal the fuel tank and thus trigger a shutoff of the refueling dispenser, it may be understood that the fuel dispenser was actively shutoff via the controller sending a signal to the FTIV to close, thus resulting in the pressure build to induce the refueling dispenser to shut off. Accordingly, at time t4, the fuel dispense rate is indicated to go from a maximum dispense level, to off. With the fuel dispenser shut off, fuel level in the fuel tank reaches a plateau, indicated by plot 815.

Because the FTIV is commanded closed in order to seal the fuel tank, pressure in the fuel tank remains high while the FTIV is closed. Thus, at time t5, the FTIV is commanded open, in order to depressurize the fuel tank. More specifically, with the FTIV commanded open at time t5, and with the CVV open, indicated by plot 830, the fuel tank may be coupled to atmosphere. As such, pressure in the fuel tank returns to atmospheric pressure between time t5 and t6, indicated by plot 820.

Responsive to an indication that pressure in the fuel system has returned to atmospheric pressure, the FTIV is commanded closed at time t6, thus sealing the fuel tank from atmosphere. Furthermore, it is indicated that refueling is no longer requested, as the refueling event was actively stopped by commanding closed the FTIV to induce a shutoff of the refueling dispenser. As discussed above, responsive to the refueling event being terminated due to an indication of misfueling, such an indication of misfueling may result in a malfunction indicator light (MIL) being illuminated on a dash of the vehicle, such that the vehicle operator may be alerted as to the misfueling event. Furthermore, the vehicle operator may be alerted via the MIL to not attempt to operate the vehicle, without first servicing the vehicle to prevent the introduction of diesel fuel into the engine and associated components.

Accordingly, between time t6 and t7, after the refueling event is complete and with misfueling detected, the vehicle is maintained in its current state until mitigating actions may be undertaken.

While the above examples have focused on misfueling events defined as the introduction of diesel fuel into a vehicle fuel tank configured for gasoline (or other fuel blend), such a methodology may similarly be used to indicate misfueling of a diesel vehicle with gasoline (or other fuel blend). Briefly, during refueling of a diesel-powered vehicle, a fuel dispense rate may be indicated according to the methods described above, and misfueling threshold(s) may be adjusted accordingly. For example, a lookup table stored at the vehicle controller may be used to indicate an expected pressure in the fuel tank during a refueling event, in the event that the fuel tank is filled with gasoline, and not diesel fuel. Subsequently, a misfueling threshold may be adjusted. Thus, if during refueling, pressure in the fuel tank rises to or above the adjusted misfueling threshold, then it may be indicated that misfueling has occurred (e.g. gasoline or other fuel blend introduced to a fuel tank in a diesel vehicle). Responsive to such an indication of misfueling, the fuel tank may be actively sealed by any means commonly known in the art, such that misfueling of the tank may be terminated. In another example, a lookup table stored at the vehicle controller may be used to indicate an expected pressure in the fuel tank during a refueling event, in the event that the fuel tank is filled with diesel fuel. In such an example, a lookup table stored at the vehicle controller may be used to indicate an expected pressure in the fuel tank during a refueling event, in the event that the fuel tank is filled with diesel fuel. Subsequently, a misfueling threshold may be adjusted. Thus, if during refueling, pressure in the fuel tank rises to or above the adjusted misfueling threshold, then it may be indicated that misfueling has occurred, wherein the misfueling of the fuel tank includes the addition of gasoline or other fuel blend that does not include diesel fuel to the fuel tank.

Responsive to such an indication of misfueling, the fuel tank may be actively sealed by any means commonly known in the art, such that misfueling of the tank may be terminated. For example, if the vehicle is equipped with a FTIV, the FTIV may be commanded closed. If the vehicle is not equipped with a FTIV, but is equipped with a CVV, then the CVV may be commanded closed. Both of the described examples above achieve the same goal of indicating misfueling. However, in the first example, a misfueling threshold may be set based on an expected pressure (where expected pressure is a function of dispense rate) during refueling if gasoline were added to the diesel fuel tank, whereas in the second example, a misfueling threshold may be set based on an expected pressure during refueling if diesel fuel were added to the diesel fuel tank.

The above examples illustrate methods for diagnosing the addition of diesel fuel to a vehicle configured for gasoline (or other fuel blend), or vice versa. For example, the method depicted above may in some examples be utilized to conduct a misfueling test diagnostic on either a flex-fuel vehicle, or a non-flex-fuel vehicle. However, another example may include indicating misfueling as specifically applied to a non-flex-fuel vehicle.

As discussed above, a reid vapor pressure (RVP) of fuel may differ depending on the particular month(s) of the year. An example may include, during summer months where temperatures increase, RVP of fuel may be kept low to prevent undesired evaporative emissions due to fuel vaporization effects. Alternatively, during winter months, the RVP of fuel may be increased, as environmental temperatures decrease. Increasing RVP may improve vehicle starting conditions, for example, during winter months. However, introduction of fuel containing a high percentage of ethanol (for example E85 or E100, which contain 85% or 100% ethanol, respectively), into a non-flex-fuel vehicle fuel tank may result in engine starting problems, and other complications. Thus, it may be desirable to indicate whether a non-flex-fuel vehicle is being refueled with E85 or E100 fuel, such that mitigating actions may be taken prior to attempting to start the vehicle. Furthermore, it may additionally be desirable to indicate whether the misfueling of the vehicle includes the addition of E85 or E100, for example, or diesel fuel.

Turning now to FIG. 9, an example high-level method 900 for conducting determining whether a vehicle is a non-flex fuel vehicle, and whether conditions are met for conducting a misfueling test diagnostic procedure, is shown. Method 900 will be described with reference to the systems described herein and shown in FIGS. 1-2, though it should be understood that similar methods may be applied to other systems without departing from the scope of this disclosure. Method 900 may be carried out by a controller, such as controller 212 in FIG. 2, and may be stored at the controller as executable instructions in non-transitory memory. Instructions for carrying out method 900 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, such as fuel tank isolation valve (FTIV) (e.g. 252), canister vent valve (CVV) (e.g. 297), canister purge valve (CPV) (e.g. 261), etc., according to the methods depicted below. It may be understood that method 900 contains a number of steps that are the same as the steps illustrated above with respect to FIG. 4. Thus, steps in method 900 that are the same as those in method 400 may be reiterated briefly here, but may not be described again in entirety in order to avoid redundancy.

Method 900 begins at 905, and may include evaluating current operating conditions. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., various evaporative emissions system conditions, such as fuel vapor canister load, fuel tank pressure, etc., as well as various ambient conditions, such as ambient temperature, humidity, barometric pressure, etc.

Proceeding to step 907, method 900 may include indicating whether the vehicle comprises a non-flex-fuel vehicle. As discussed above, a non-flex-fuel vehicle may comprise a vehicle that is not a flex-fuel vehicle, where a flex-fuel vehicle may comprise a vehicle designed to run on more than one fuel, typically gasoline blended with either ethanol or methanol fuel, and wherein both fuels may be stored in a common fuel tank. Information pertaining to whether the vehicle comprises a non-flex-fuel, or a flex-fuel, may be stored at the vehicle controller, in an example. Thus, at 907, if it is indicated that the vehicle is a flex-fuel vehicle, method 900 may end.

Alternatively, if, at 907, it is indicated that the vehicle comprises a non-flex-fuel vehicle, method 900 may proceed to 910. At 910, method 900 may include indicating whether a refueling event is requested. As discussed above with regard to FIG. 4, a refueling request may comprise vehicle operator depression of a refueling button (e.g. 197), a refueling operator requesting access to a fuel filler neck, etc. If, at 910, a request for refueling is not indicated, method 900 may proceed to 915. At 915, method 900 may include maintaining the vehicle fuel system and evaporative emissions system status, which may include maintaining components such as the FTIV, CVV, CPV and refueling lock in their current conformation and/or activity. Method 900 may then end.

Returning to 910, if a request for refueling is indicated, method 900 may proceed to 920, and may include determining whether conditions are met for conducting a misfueling diagnostic. Conditions being met for a misfueling diagnostic may include an indication that undesired evaporative emissions are not indicated in either the fuel system (e.g. 218) or evaporative emissions system (e.g. 251), for example. Such a method for conducting an evaporative emissions test diagnostic procedure is illustrated by the method 500 depicted at FIG. 5, and has been discussed above in detail.

If conditions for conducting the misfueling diagnostic are not met, method 900 may proceed to step 925, and may include conducting the refueling event without additionally conducting the misfueling diagnostic. Such an example of conducting a refueling diagnostic as such has been described in detail above with regard to step 425 of FIG. 4. For brevity, the details will not be reiterated here, but it may be understood that step 925 of method 900 may be carried out as discussed above for step 425 of method 400.

Returning to step 920, if conditions for conducting the misfueling diagnostic are met, method 900 may proceed to 930, and may include indicating whether high fuel RVP conditions are present. Indicating whether high fuel RVP (e.g. near 13 psi) conditions are present or not may include the vehicle control system communicating wirelessly, to other vehicles or infrastructures via a wireless network (e.g. 131), in order to retrieve information as to whether fuel being dispensed at a particular gas station is high RVP. As an example, responsive to a request for refueling (discussed at step 910), the vehicle controller may send a request to a particular gas station as to whether the gas station is dispensing high RVP fuel. The request may be received by the gas station's communications system (e.g. server, website, etc.), processed, and sent back to the vehicle controller. In some examples, a vehicle location, climate where the vehicle is positioned, time of year, etc., may be additionally communicated to the vehicle controller, via an onboard navigation system (e.g. 132), such as a global positioning system (GPS). In some examples, vehicle location as determined by the onboard navigation system may be utilized in conjunction with the internet, for example, to determine whether high RVP fuel may be being dispensed in the particular locality that the vehicle is operating in. For example, based on an indicated vehicle location as provided via the onboard navigation system, a signal may be sent via the vehicle controller requesting information via the internet, for example, as to whether high RVP fuel is being dispensed at the particular gas station the vehicle is refueling at. Such examples are illustrative, and are not meant to be limiting. For example, any means known in the art may be utilized to indicate whether a particular gas station that the vehicle is attempting to refuel at is dispensing high RVP fuel (e.g. winter fuel), or not.

If, at 930, it is indicated that high fuel RVP conditions are not present, method 900 may proceed to step 935, and may include conducting the refueling operation and misfueling diagnostic test procedure (also referred to herein as a volatility test), according to FIG. 6. More specifically, because high RVP conditions are not indicated to be present, a misfueling diagnostic may not include deciphering between whether diesel or an ethanol (or methanol) fuel blend is undesirably being added to the fuel tank. Instead, as discussed above in detail with regard to FIG. 6, it may be indicated as to whether diesel fuel is being undesirably (e.g. incorrectly) added to the fuel tank. As such a method is discussed in detail above, the description will not be reiterated here. However, it may be understood that step 935 may include carrying out method 600 essentially as described above at FIG. 6.

Returning to step 930, if high fuel RVP conditions are indicated, method 930 may proceed to 940. At 940, method 900 may include conducting the refueling operation and misfueling test diagnostic procedure according to FIG. 10, discussed in detail below.

Figure 10:
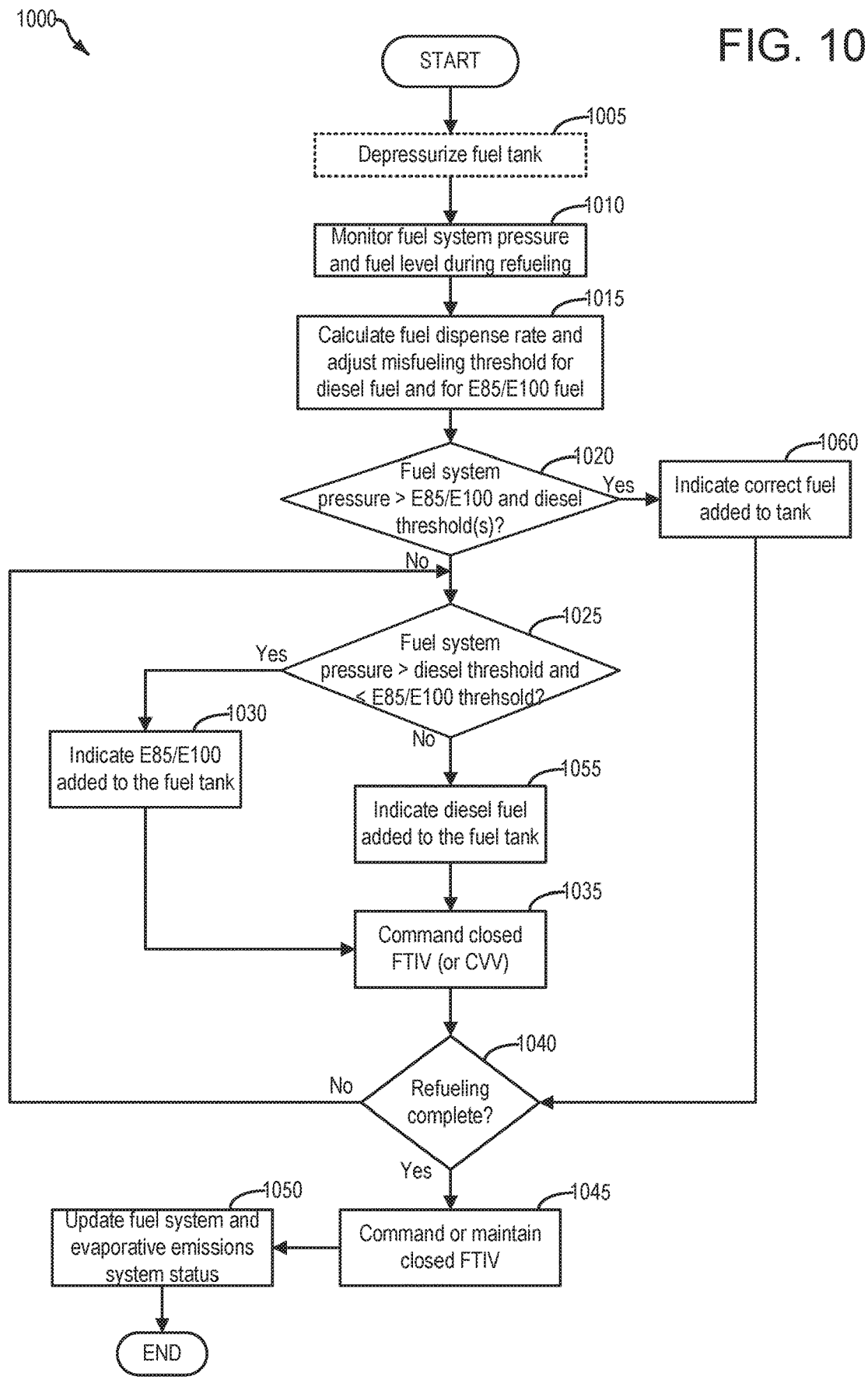
FIG. 10 shows a high-level flowchart for an example method for conducting a misfueling diagnostic during refueling a vehicle fuel tank, where the vehicle comprises a non-flexible-fuel vehicle.

Turning now to FIG. 10, a method 1000 for conducting a refueling operation and a misfueling diagnostic on a non-flex-fuel vehicle, is shown. More specifically, method 1000 may be used to conduct a misfueling diagnostic on a non-flex-fuel vehicle where the misfueling diagnostic may include determining whether diesel fuel is being added to a fuel tank of the non-flex-fuel vehicle, or whether E85/E100 is being added to the fuel tank. If neither diesel fuel nor E85/E100 are indicated as to being added to the fuel tank, it may be determined that a desired fuel type (e.g. the correct fuel type) is being added to the vehicle engine. Responsive to an indication that either diesel fuel or E85/E100 is being added to the fuel tank, the refueling event may be actively stopped, by inducing a pressure increase in the fuel tank which may thus shut off a refueling dispenser providing fuel to the fuel tank.

Said another way, method 1000 may be used to send a wireless request for information pertaining as to whether a gas-station is dispensing high reid vapor pressure fuel, receive a wireless response (where both sending and receiving may be carried out by the vehicle controller), and responsive to an indication that the gas station is dispensing high reid vapor pressure fuel, adjust at least two misfueling pressure thresholds. One misfueling pressure threshold may be adjusted based on expected pressure if diesel fuel were being added to the fuel tank, and another misfueling pressure threshold may be adjusted based on expected pressure if high reid vapor pressure fuel were being added to the fuel tank. In one example, it may be indicated that diesel fuel (e.g. incorrect fuel) is being added to the fuel tank responsive to actual pressure (e.g. measured pressure) in the fuel tank during refueling being below both of the at least two misfueling pressure thresholds. In another example, it may be indicated that E85 or E100 (e.g. incorrect fuel(s)) is being added to the fuel tank responsive to actual pressure in the fuel tank during refueling being above the one misfueling pressure threshold (e.g. threshold if diesel were being added), but below the other misfueling pressure threshold (e.g. threshold if high RVP fuel were being added). In still another example, it may be indicated that high reid vapor pressure fuel (e.g. correct fuel) is being added to the fuel tank responsive to actual pressure in the fuel tank during refueling being above both misfueling pressure thresholds.

Method 1000 will be described with reference to the systems described herein and shown in FIGS. 1-2, though it should be understood that similar methods may be applied to other systems without departing from the scope of this disclosure. Method 1000 may be carried out by a controller, such as controller 212 in FIG. 2, and may be stored at the controller as executable instructions in non-transitory memory. Instructions for carrying out method 1000 and the rest of the methods included herein may be executed by the controller based on instructions stored on a memory of the controller and in conjunction with signals received from sensors of the engine system, such as the sensors described above with reference to FIGS. 1-2. The controller may employ fuel system and evaporative emissions system actuators, such as fuel tank isolation valve (FTIV) (e.g. 252), canister vent valve (CVV) (e.g. 297), canister purge valve (CPV) (e.g. 261), etc., according to the method depicted below. Furthermore, a number of steps in method 1000 are similar or the same as steps previously described above with respect to method 600 depicted at FIG. 6. As such, all of the details of the steps that are the same or similar to steps indicated by method 600 may not be reiterated in their entirety, but may be briefly reiterated below. In each case where the same methodology for a particular step may apply to both method 1000 and method 600, the relevant step of method 600 will be referred to as method 1000 is discussed.

Method 1000 continues from method 900, and includes depressurizing the fuel tank at step 1005, responsive to an indication that the vehicle comprises a non-flex-fuel vehicle, that a refueling event is requested, and further responsive to an indication that conditions are met for conducting a misfueling test diagnostic. Accordingly, at step 1005, method 1000 may include depressurizing the fuel tank, essentially as described above with regard to step 605 of method 600. For example, the controller (e.g. 212) may open FTIV (e.g. 252) and open or maintain open a vent path between the fuel vapor canister and atmosphere (e.g. open CVV), while maintaining the CPV (e.g. 261) closed, to depressurize the fuel tank before enabling fuel to be added therein.

Step 1005 is illustrated as a dashed box in order to indicate that step 1005 may not be carried out in a vehicle that does not include a FTIV. In such an example where a vehicle does not include an FTIV, the CVV (e.g. 297) may be typically maintained open, except for during test diagnostic procedures to identify the presence or absence of undesired evaporative emissions. Thus, in an example where a vehicle is not equipped with an FTIV, the fuel tank may typically be at or near atmospheric pressure, and thus a depressurization procedure prior to refueling may not be conducted.

Proceeding to step 1010, method 1000 may include monitoring actual pressure in the fuel system, and may further include monitoring a fuel fill level in the fuel tank, during conducting the refueling event. As discussed above, monitoring pressure in the fuel system may be carried out by a fuel tank pressure transducer (e.g. 291), and monitoring a fuel fill level may be conducted via a fuel fill level sensor (e.g. 234).

Continuing to 1015, method 1000 may include calculating a fuel dispense rate. As discussed above, a fuel dispense rate (also referred to herein as a refuel fill rate, or fuel fill rate) may be determined via the vehicle controller, and may be based on an amount of fuel added to the tank (e.g. fuel fill level change over a predetermined time), and a capacity of the fuel tank. With knowledge of an amount of fuel added to the tank at a particular time, and with a further knowledge of a capacity of the fuel tank, a fuel dispense rate may be calculated according to equation (1) as discussed above. Briefly, a rate of change in fuel level in the fuel tank may be multiplied by fuel tank capacity, to indicate a fuel fill rate (dispense rate). By determining a fuel fill rate, misfueling thresholds for determining whether a desired fuel (e.g. high RVP fuel), whether E85 or E100, or whether diesel fuel is being added to the tank, may be adjusted.

More specifically, as discussed above, responsive to a particular fuel fill rate, a certain pressure may be expected to develop in the fuel tank during the refueling event. Such information may be stored at the controller in a lookup table, for example, where the information contained in the lookup table may comprise fuel fill rate, and expected pressure builds. In such an example, the expected pressure build may be further based on an indicated fuel RVP, where, as described above, an indication of fuel RVP may be requested via the vehicle controller via wireless communication between the vehicle controller and a refueling station communications system, the internet, etc. With fuel RVP indicated, in addition to fuel fill rate being determined, an expected fuel tank pressure may be determined, if the fuel being added to the tank were the correct type of fuel for the vehicle.

Similar to the step described above at step 615 of FIG. 6 then, a lookup table stored at the vehicle controller may be used to adjust misfueling pressure thresholds. However, the methodology for adjusting the misfueling pressure thresholds according to method 1000 may differ slightly from the methodology discussed at FIG. 6, because both an E85/E100 misfueling pressure threshold may be set/adjusted, in addition to a diesel fuel misfueling pressure threshold.

As such, the E85/E100 misfueling pressure threshold may be adjusted as described above at step 615. More specifically, the E85/E100 misfueling pressure threshold may be adjusted to be near the expected fuel tank pressure, where expected fuel tank pressure is a function of fuel fill rate (and indicated fuel RVP). In some examples, the E85/E100 misfueling pressure threshold may be adjusted to be one, two, or three InH2O below the expected pressure in the fuel system. In other examples, the E85/E100 misfueling threshold may be set at greater than three InH2O, or less than one InH20, below the expected pressure in the fuel system, the expected pressure a function of the fuel fill rate (dispense rate).

At step 1015, the diesel misfueling pressure threshold may be adjusted as follows. A lookup table stored at the vehicle controller may include information as to an expected pressure build if diesel fuel were being added to the vehicle fuel tank, based on a capacity of the fuel tank and the fuel fill rate. For example, if the fuel fill rate is indicated to be 8 gallons per minute, then an expected fuel tank pressure may be indicated if diesel fuel were being added to the fuel tank. Thus, a diesel misfueling threshold may be adjusted as a function of the expected fuel tank pressure if diesel fuel were being added to the tank. It may be understood that the diesel misfueling pressure threshold may be greater than the expected fuel tank pressure (if diesel were being added to the tank), but less than the adjusted E85/E100 misfueling pressure threshold. For example, the adjusted diesel misfueling pressure threshold may be 1 InH2O, 2 InH2O, or 3 InH2O above the expected fuel tank pressure, where the expected fuel tank pressure comprises a pressure if diesel fuel were being added to the tank. In other examples, the adjusted misfueling pressure threshold may be adjusted to less than 1 InH2O above the expected fuel tank pressure, or greater than 3 InH2O above the expected fuel tank pressure, where again, the expected fuel tank pressure comprises a pressure if diesel fuel were being added to the tank at the given fill rate.

Thus, at step 1015 of method 1000, it may be understood that two misfueling pressure thresholds may be set/adjusted. An E85/E100 misfueling pressure threshold may be set, which may be below an expected fuel tank pressure (where the expected fuel tank pressure is based on the correct type of fuel being added to the tank), and a diesel misfueling pressure threshold, which may be above an expected fuel tank pressure (where the expected fuel tank pressure is based on diesel fuel being added to the tank). Said another way, the diesel misfueling pressure threshold may be set lower than the E85/E100 misfueling pressure threshold.

Proceeding to step 1020, with the diesel and E85/E100 misfueling pressure thresholds adjusted, it may be determined whether actual pressure in the fuel system as monitored via a fuel tank pressure transducer, for example, is above both the diesel misfueling pressure threshold and the E85/E100 misfueling pressure threshold. If, at 1020, it is indicated that actual pressure in the fuel system is not above both the diesel misfueling pressure threshold and the E85/E100 misfueling pressure threshold, method 1000 may proceed to 1025.

At step 1025, method 1000 may include indicating whether actual pressure in the fuel system is greater than the diesel misfueling pressure threshold, but less than the E85/E100 misfueling pressure threshold. If so, method 1000 may proceed to 1030, and may include indicating that E85 or E100 has been added to the fuel tank, rather than the desired fuel type. More specifically, because actual pressure in the fuel tank is above the diesel misfueling pressure threshold, then it may be determined that diesel fuel is not being added to the tank. However, because pressure in the fuel tank is not indicated to rise above the E85/E100 misfueling pressure threshold, it may be determined that E85 or E100 (or other similar fuel type) is being added to the fuel tank.

As such, method 1000 may proceed to 1035, and may include commanding closed the FTIV (or CVV). As discussed above with regard to step 625 of method 600, the controller may send a signal to the FTIV, or to the CVV, commanding either the FTIV, or CVV to a closed state. By commanding closed the FTIV (where included) or CVV, the fuel tank may be sealed from atmosphere. Said another way, flow of air and fuel vapor in a conduit coupling the fuel tank to the fuel vapor canister may be controlled via a FTIV. Similarly, flow of air and fuel vapor in a vent line coupling the fuel vapor storage canister to atmosphere may be controlled via a CVV. Thus, sealing the fuel tank to actively induce a shutoff of the refueling dispenser may include commanding closed the FTIV (or CVV).

By sealing the fuel tank from atmosphere while fuel is being dispersed into the fuel tank, pressure in the fuel tank may rapidly build, which may trigger a shutoff of the refueling dispenser being utilized to add fuel to the fuel tank. Triggering a shutoff of the refueling dispenser may thus prevent additional fuel from being added to the fuel tank. In the case where E85 or E100 (or a similar blend) fuel is being added to the tank discontinuing the addition of E85/E100 fuel may result in a reduction in complications stemming from the addition of the incorrect fuel type to the fuel tank. Furthermore, with the fuel system sealed from atmosphere via the closing of the FTIV or CVV, any further attempts to add fuel to the fuel tank may be rapidly discontinued, thus a vehicle operator may be alerted to the fact that a misfueling event has occurred, and that no further attempts to refuel the vehicle should be undertaken.

Proceeding to 1040, method 1000 may include indicating whether the refueling event is complete. Determining whether the refueling event is complete at step 1040 may be carried out essentially as described at step 635 of method 600, and as such, will not be reiterated here. Responsive to an indication that the refueling event is complete, method 1000 may proceed to 1045, and may include maintaining closed the FTIV, if the FTIV were commanded closed at step 1035 of method 1000. Alternatively, as discussed above, if the CVV was commanded closed at step 1035, then the CVV may be commanded open. By commanding open the CVV at step 1045, the fuel tank may be fluidically coupled to the evaporative emissions system, wherein fuel vapors from the fuel tank may be routed to the fuel vapor storage canister for storage, prior to exiting to atmosphere via the open CVV. However, because the vehicle was misfueled, in some examples the CVV may be maintained closed at step 1045 in the case where the vehicle does not include a FTIV.

Proceeding to 1050, method 1000 may include updating the vehicle fuel system and evaporative emissions system status. For example, updating the fuel system and evaporative emissions system status may include illuminating a malfunction indicator light (MIL) on the dash, alerting the vehicle operator of the misfueling event, and providing an indication that the vehicle needs to be serviced. For example, by stopping the addition of E85/E100 fuel into the fuel tank and alerting the vehicle operator of the misfueling event, mitigating actions may be taken prior to starting the engine, such that engine starting issues may be avoided or prevented. Method 1000 may then end.

Returning to step 1025, if it is indicated that actual pressure in the fuel system is less than the diesel misfueling pressure threshold, method 1000 may proceed to 1055, and may include indicating that diesel fuel is being added to the fuel tank. It may be understood that for actual pressure in the fuel system to be less than the diesel misfueling pressure threshold, actual pressure may also be below the E85/E100 misfueling pressure threshold. Such an indication may be stored at the vehicle controller, for example. Method 1000 may then proceed to 1035, and may include commanding closed the FTIV (or CVV) essentially as described above. Method 1000 may then proceed to step 1040, which may be carried out essentially as described above. If refueling is indicated to be complete, method 1000 may proceed to 1045, and may include maintaining closed the FTIV, if the FTIV were commanded closed at step 1045 of method 1000. Alternatively, as discussed above, if the CVV was commanded closed at step 1035, then the CVV may be commanded open. By commanding open the CVV at step 1045, the fuel tank may be fluidically coupled to the evaporative emissions system, wherein fuel vapors from the fuel tank may be routed to the fuel vapor storage canister for storage, prior to exiting to atmosphere via the open CVV. However, because the vehicle was misfueled, in some examples the CVV may be maintained closed at step 1045 in the case where the vehicle does not include a FTIV.

Proceeding to 1050, method 1000 may include updating the vehicle fuel system and evaporative emissions system status. For example, updating the fuel system and evaporative emissions system status may include illuminating a malfunction indicator light (MIL) on the dash, alerting the vehicle operator of the misfueling event, and providing an indication that the vehicle needs to be serviced. For example, by stopping the addition of diesel fuel into the fuel tank and alerting the vehicle operator of the misfueling event, subsequent driving of the vehicle after the misfueling event may be prevented. Method 1000 may then end.

Returning to step 1020, if, during the refueling event, fuel system pressure is indicated to be above both the adjusted diesel misfueling pressure threshold and the adjusted E85/E100 misfueling pressure threshold, method 1000 may proceed to 1060. At 1060, method 1000 may include indicating that the correct fuel is being added to the fuel tank. For example, it may be indicated that the high RVP fuel (e.g. the correct fuel) is being added to the fuel tank. Because the correct fuel is being added to the fuel tank, no additional action may be taken during the refueling event.

Proceeding to 1040, method 1000 may include indicating whether the refueling event is complete. As discussed above, completion of refueling may be indicated when fuel level in the tank has plateaued for a predetermined duration of time, responsive to an indication that a refueling nozzle has been removed from the fuel filler neck, responsive to an indication that a fuel cap has been replaced, that a refueling door has been closed, etc.

Proceeding to 1045, method 600 may include commanding closed the FTIV to seal the fuel tank. In a case where the vehicle is not equipped with a FTIV, and where the CVV was maintained open during the refueling event, the CVV may be maintained open at step 1045. As discussed above, by commanding open the CVV at step 1045, the fuel tank may be fluidically coupled to the evaporative emissions system, wherein fuel vapors from the fuel tank may be routed to the fuel vapor storage canister for storage, prior to exiting to atmosphere via the open CVV.

Continuing to 1050, method 1000 may include updating the vehicle fuel system and evaporative emissions system status. For example, a level of fuel in the fuel tank may be updated and displayed on the vehicle dash, responsive to the recent refueling event. Method 1000 may then end.

Turning now to FIG. 11, an example timeline 1100 is shown for conducting a refueling event and a misfueling test diagnostic, where the vehicle comprises a non-flex-fuel vehicle, according to the methods depicted herein and shown in FIG. 5, and FIGS. 9-10, and as applied to the systems described herein and with reference to FIGS. 1-2. Timeline 1100 includes plot 1105, indicating whether refueling is requested, over time. Timeline 1100 further includes plot 1110, indicating whether conditions are met for conducting a misfueling test diagnostic procedure (volatility test), over time. Timeline 1100 further includes plot 1112, indicating whether high RVP fuel is being dispensed at a particular gas station or gas stations in the proximity of where the vehicle is attempting to refuel, over time. Timeline 1100 further includes plot 1115, indicating a fuel level in the fuel tank, over time. For example, a fuel level sensor (e.g. 234) located in the fuel tank (e.g. 220) may provide an indication of the fuel level (fuel level input, or FLI), to the vehicle controller (e.g. 212). Timeline 1100 further includes plot 1120, indicating pressure in the vehicle fuel system, over time. Pressure may be monitored, for example, via one or more fuel tank pressure transducers (FTPT) (e.g. 291). Pressure in the fuel system may be positive (+) or negative (−) with respect to atmospheric pressure (Atm.). Line 1121 represents an adjusted E85/E100 misfueling pressure threshold, where, if during refueling, pressure in the fuel tank is greater than the E85/E100 misfueling pressure threshold, then it may be indicated that the correct (e.g. high RVP) fuel is being added to the fuel tank. Line 1122 represents an adjusted diesel misfueling pressure threshold where, if during refueling, pressure in the fuel tank is below the diesel misfueling pressure threshold, then it may be indicated that diesel fuel (e.g. incorrect fuel type) is being added to the fuel tank. Furthermore, in a case where pressure in the fuel tank is above the diesel misfueling pressure threshold, but below the E85/E100 misfueling pressure threshold, then it may be indicated that either E85 or E100 is being added to the fuel tank.

Timeline 1100 further includes plot 1125, indicating whether a fuel tank isolation valve (FTIV) (e.g. 252) is open or closed, over time. Timeline 1100 further includes plot 1130, indicating whether a canister vent valve (CVV) (e.g. 297) is open, or closed, over time. Timeline 1100 further includes plot 1135, indicating a fuel dispense rate from a fuel dispenser nozzle, for example, over time. In this example timeline 1100, fuel dispense rate may either be off, or may be at a maximum (max) level for the particular refueling dispenser nozzle. Timeline 1100 further includes plot 1140, indicating whether E85/E100 misfueling is detected, over time. Timeline 1100 further includes plot 1145, indicating whether diesel fuel misfueling is detected, over time.

At time t0, while not explicitly illustrated, it may be understood that the non-flex-fuel vehicle has come to a stop at a gas station, with the intent to refuel the vehicle. However, at time t0, refueling is not yet requested, indicated by plot 1105. As refueling is not requested, test conditions for conducting a misfueling test diagnostic are not indicated to be met, illustrated by plot 1110. Thus, E85/E100 misfueling is not indicated, illustrated by plot 1140, and diesel misfueling is not indicated, illustrated by plot 1145. As refueling is not yet requested, fuel dispense rate of a fuel dispenser nozzle, is indicated to be in an off-state, illustrated by plot 1135. Fuel level in the vehicle fuel tank is indicated to be near empty, illustrated by plot 1115. Furthermore, the FTIV is closed, and the CVV is open, indicated by plots 1125 and 1130, respectively. With the FTIV closed, thus sealing the fuel tank from atmosphere, pressure in the fuel system is indicated to be slightly above atmospheric pressure.

At time t1, a request for refueling is indicated. As discussed above, a request for refueling may include a vehicle operator depressing a refueling button on a vehicle instrument panel in the vehicle (e.g. refueling button 197), or at a refueling door. In some examples, a refueling request may comprise a refueling operator requesting access to a fuel filler neck, for example, by attempting to open a refueling door, and/or attempting to remove a gas cap, etc.

With refueling requested at time t1, it is further indicated that conditions are met for conducting a volatility test (misfueling test diagnostic). As discussed above, conditions being met for a misfueling diagnostic may include an indication that undesired evaporative emissions are not indicated in either the fuel system (e.g. 218), or evaporative emissions system (e.g. 251), for example.

Still further, as refueling is requested, the vehicle FTIV is commanded open, indicated by plot 1125. With the FTIV commanded open, pressure in the fuel tank returns to atmospheric pressure between time t1 and t2. With the fuel tank thus depressurized at time t2, refueling is indicated to commence, represented by plot 1135. More specifically, fuel is indicated to be dispensed from a refueling dispenser nozzle at a maximum rate for such a dispenser nozzle. Accordingly, between time t2 and t3, fuel level in the fuel tank is indicated to rise, illustrated by plot 1115.

As discussed above, pressure in the fuel system during refueling the fuel tank may be a function of fuel dispense rate, where the fuel being dispensed is gasoline (or other fuel blend). Accordingly, while fuel is being added to the tank between time t2 and t3, a refueling rate (dispense rate) may be determined via the vehicle controller, based on an amount of fuel added to the tank over a particular time period, and a capacity of the fuel tank being refueled, where the capacity may be programmed into the vehicle controller memory, for example. Specifically, the vehicle controller may calculate the fuel dispense rate by multiplying a rate of change in fuel level in the tank by fuel tank capacity, as discussed above with regard to equation (1).

With the dispense rate calculated, an E85/E100 misfueling pressure threshold may be correspondingly adjusted. For example, the higher the dispense rate, the higher the pressure in the fuel tank may be expected to be while fuel (e.g. gasoline or other fuel blend) is being added to the tank. Alternatively, the lower the dispense rate, the lower the pressure in the fuel tank may be expected to be if gasoline or other fuel blend is being added to the tank. Responsive to determining the fuel dispense rate then, an expected pressure in the fuel tank may be indicated. Such an indication may be provided via a lookup table stored at the vehicle controller, for example, where the lookup table includes expected fuel tank pressure as a function of fuel dispense rate. The expected pressure may thus be used to adjust the E85/E100 misfueling pressure threshold, as a function of the fuel dispense rate. As discussed above, the E85/E100 misfueling pressure threshold may be adjusted to near the expected pressure. Accordingly, in example timeline 1100, an adjusted E85/E100 misfueling threshold is represented by line 1121.

Furthermore, a diesel misfueling pressure threshold 1122 may be adjusted as discussed above. Briefly, a lookup table stored at the vehicle controller may include information as to an expected pressure build if diesel fuel were being added to the vehicle fuel tank, based on a capacity of the fuel tank and the fuel fill rate. Thus, the diesel misfueling threshold 1122 may be adjusted as a function of the expected fuel tank pressure if diesel fuel were being added to the tank. It may be understood that the diesel misfueling pressure threshold may be greater than the expected fuel tank pressure (if diesel were being added to the tank), but less than the adjusted E85/E100 misfueling pressure threshold 1121.

With the adjusted E85/E100 misfueling pressure threshold 1121 adjusted, and with the diesel misfueling pressure threshold 1122 adjusted, it may be determined whether pressure in the fuel tank is above the E85/E100 misfueling pressure threshold, less than the E85/E100 misfueling pressure threshold but greater than the diesel misfueling pressure threshold, or below the diesel misfueling pressure threshold. As illustrated in timeline 1100, pressure in the fuel system remains below the adjusted E85/E100 misfueling pressure threshold, but above the diesel misfueling pressure threshold. As such, at time t3, E85/E100 misfueling is indicated, illustrated by plot 1140. Furthermore, because pressure in the fuel tank remained above the diesel misfueling pressure threshold, diesel misfueling is not indicated, illustrated by plot 1145.

As E85/E100 misfueling is detected at time t3, the FTIV is commanded closed, illustrated by plot 1125. Because misfueling is detected, conditions are no longer indicated to be met for conducting the volatility test (misfueling test diagnostic), illustrated by plot 1110. By closing the FTIV, thus sealing the fuel system from atmosphere, pressure may rapidly rise in the fuel tank. Accordingly, between time t3 and t4, pressure in the fuel system rapidly is indicated to rise, until a peak pressure is reached at time t4. When pressure in the fuel tank reaches a particular level (e.g. 12 InH2O), which may be understood to be the pressure indicated at the peak of plot 1120, the fuel dispenser may be triggered to shutoff, responsive to the pressure increase. Because the FTIV is utilized to seal the fuel tank and thus trigger a shutoff of the refueling dispenser, it may be understood that the fuel dispenser was actively shutoff via the controller sending a signal to the FTIV to close, thus resulting in the pressure build to induce the refueling dispenser to shut off. Accordingly, at time t4, the fuel dispense rate is indicated to go from a maximum dispense level, to off. With the fuel dispenser shut off, fuel level in the fuel tank reaches a plateau, indicated by plot 1115.

Because the FTIV is commanded closed in order to seal the fuel tank, pressure in the fuel tank remains high while the FTIV is closed. Thus, at time t5, the FTIV is commanded open, in order to depressurize the fuel tank. More specifically, with the FTIV commanded open at time t5, and with the CVV open, indicated by plot 1130, the fuel tank may be coupled to atmosphere. As such, pressure in the fuel tank returns to atmospheric pressure between time t5 and t6, indicated by plot 1120.

Responsive to an indication that pressure in the fuel system has returned to atmospheric pressure, the FTIV is commanded closed at time t6, thus sealing the fuel tank from atmosphere. Furthermore, it is indicated that refueling is no longer requested, as the refueling event was actively stopped by commanding closed the FTIV to induce a shutoff of the refueling dispenser. As discussed above, responsive to the refueling event being terminated due to an indication of misfueling, such an indication of misfueling may result in a malfunction indicator light (MIL) being illuminated on a dash of the vehicle, such that the vehicle operator may be alerted as to the misfueling event. By alerting the vehicle operator of the misfueling event, mitigating action may be taken in order to avoid engine starting conditions and other complication that may result from attempting to operate the vehicle using E85/E100 fuel.

Accordingly, between time t6 and t7, after the refueling event is complete and with misfueling detected, the vehicle is maintained in its current state until mitigating actions may be undertaken. In this way, accidental introduction of diesel fuel, or in some examples E85/E100 fuel, into a fuel tank in a vehicle, under conditions where either diesel fuel or E85/E100 fuel is not desired, may be detected prior to subsequent engine operation after completion of the refueling event. Because engine operation of a gasoline powered vehicle using diesel fuel may result in a number of complications, or engine operation using E85/E100 when high RVP fuel is desired, may in some examples warrant costly repairs, by indicating that misfueling occurred during the refueling event, mitigating action may be taken prior to starting the engine after refueling the vehicle.

The technical effect is to recognize that an inherent difference in fuel volatility between diesel fuel, E85/E100 fuel, and gasoline (including high RVP gasoline) may be utilized during a refueling event in order to indicate whether misfueling of the vehicle fuel tank is occurring. Responsive to an indication that a misfueling event is taking place, the fuel tank may be actively sealed in order to discourage further addition of the wrong type of fuel to the tank. By actively preventing further addition of the wrong type of fuel to the fuel tank, the vehicle operator may be made aware of the misfueling. Furthermore, a malfunction indicator light may be illuminated on the vehicle dash, for example, further alerting the vehicle operator of the misfueling event. As such, subsequent to misfueling of the fuel tank, engine operation may be avoided until mitigating actions are taken to prevent engine complications due to the misfueling. As such, costly repairs may be avoided, complications with engine starting may be mitigated, and customer satisfaction increased.

The systems described herein, and with reference to FIGS. 1-3, along with the methods described herein and with reference to FIGS. 4-6 and FIGS. 9-10, may enable one or more systems and one or more methods. In one example, a method comprises during refueling a fuel tank of a vehicle via a refueling dispenser, routing fuel vapors from the fuel tank to a fuel vapor storage canister positioned in an evaporative emissions system that is coupled to the fuel tank; and responsive to an indication of misfueling: sealing the fuel tank to actively induce a shutoff of the refueling dispenser. In a first example of the method, the method further comprises monitoring an actual pressure in the fuel tank via a fuel tank pressure sensor during refueling; determining an expected pressure in the fuel tank during refueling; adjusting at least one misfueling pressure threshold based at least in part on the expected pressure in the fuel tank during refueling; indicating misfueling based on whether the actual pressure is above, or below the adjusted misfueling pressure threshold(s); and wherein misfueling includes addition of an incorrect fuel type to the fuel tank. A second example of the method optionally includes the first example and further comprises monitoring a fuel fill level in the fuel tank during refueling the tank via a fuel level sensor positioned in the fuel tank; indicating a dispense rate of fuel into the fuel tank based on a fuel fill level change over a predetermined time period, wherein the dispense rate is determined via multiplying a capacity of the fuel tank by the fuel fill level change over the predetermined time period; and wherein the expected pressure in the fuel tank during refueling is a function of the dispense rate of fuel into the fuel tank. A third example of the method optionally includes any one or more or each of the first and second examples and further comprises increasing the at least one misfueling pressure thresholds responsive to an increase in the expected pressure in the fuel tank during refueling; and decreasing the at least one misfueling pressure thresholds responsive to a decrease in the expected pressure in the fuel tank during refueling. A fourth example of the method optionally includes any one or more or each of the first through third examples, and further includes wherein the vehicle is configured to run on gasoline or other fuel blend that does not include diesel fuel; wherein indicating misfueling includes indicating that the actual pressure in the fuel tank is below the adjusted misfueling pressure threshold(s); and wherein indicating misfueling includes addition of diesel fuel to the fuel tank. A fifth example of the method optionally includes any one or more or each of the first through fourth examples and further includes wherein the vehicle is configured to run on diesel fuel; wherein indicating misfueling includes indicating that the actual pressure in the fuel tank is above the adjusted misfueling pressure threshold(s); and wherein indicating misfueling includes addition of gasoline or other fuel blend to the fuel tank. A sixth example of the method optionally includes any one or more or each of the first through fifth examples and further comprises determining that fuel being dispensed from the refueling dispenser is high reid vapor pressure fuel; wherein indicating misfueling includes indicating that the fuel being added to the fuel tank is E85 or E100 responsive to actual pressure below one adjusted misfueling pressure threshold and above another adjusted misfueling pressure threshold; wherein indicating misfueling includes indicating that the fuel being added to the fuel tank is diesel fuel responsive to actual pressure below both adjusted misfueling pressure thresholds; and indicating high reid vapor pressure fuel is being added to the fuel tank responsive to actual pressure in the fuel tank being above both adjusted misfueling pressure thresholds. A seventh example of the method optionally includes any one or more or each of the first through sixth examples and further comprises controlling a flow of air and fuel vapor in a vent line coupling the fuel vapor storage canister to atmosphere via a canister vent valve; and wherein sealing the fuel tank to actively induce a shutoff of the refueling dispenser includes commanding closed the canister vent valve. An eighth example of the method optionally includes any one or more or each of the first through seventh examples and further comprises controlling a flow of air and fuel vapor in a conduit coupling the fuel tank to the fuel vapor storage canister via a fuel tank isolation valve; wherein responsive to the indication of misfueling, the fuel tank isolation valve is commanded closed to seal the fuel tank, to actively induce the active shutoff of the refueling dispenser. A ninth example of the method optionally includes any one or more or each of the first through eighth examples and further comprises indicating a presence or an absence of undesired evaporative emissions in the fuel tank and evaporative emissions system prior to refueling the fuel tank; and wherein the indication of misfueling is only determined responsive to the indicated absence of undesired evaporative emissions, and not under conditions where undesired evaporative emissions are indicated. A tenth example of the method optionally includes any one or more or each of the first through ninth examples and further comprises reducing pressure in the fuel tank and evaporative emissions system to a predetermined negative pressure threshold; sealing the fuel tank and evaporative emissions system from atmosphere responsive to pressure in the fuel tank and evaporative emissions system reaching the predetermined negative pressure threshold; and indicating the presence of undesired evaporative emissions responsive to a pressure bleedup greater than a predetermined bleedup pressure threshold, or responsive to pressure bleedup in the fuel tank and evaporative emissions system changing at a rate greater than a predetermined pressure bleedup threshold rate. An eleventh example of the method optionally includes any one or more or each of the first through tenth examples and further includes wherein sealing the fuel tank to actively induce a shutoff of the refueling dispenser prevents fuel from being further added to the tank subsequent to the induced shutoff.

An example of a system for a vehicle comprises a fuel tank positioned in a fuel system, the fuel tank coupled to an evaporative emissions system; a fuel vapor storage canister, positioned in the evaporative emissions system; a canister vent valve, positioned in a vent line coupling the fuel vapor storage canister to atmosphere; a fuel level sensor positioned in the fuel tank; and a controller, storing instructions in non-transitory memory, that when executed, cause the controller to: responsive to a request for refueling the fuel tank, command open or maintain open the canister vent valve; in a first condition, including an indication that a correct fuel type is being added to the fuel tank during refueling, maintain the canister vent valve open until an indication that the refueling is complete; and in a second condition, including an indication that an incorrect fuel type is being added to the fuel tank during refueling, command closed the canister vent valve to actively terminate the refueling. In a first example, the system further comprises a fuel tank isolation valve positioned in a conduit coupling the fuel tank to the fuel vapor canister; and wherein the controller further stores instructions in non-transitory memory, that when executed, cause the controller to: responsive to the request for refueling, command open or maintain open the fuel tank isolation valve and the canister vent valve; in the first condition, maintain the fuel tank isolation valve and the canister vent valve open until an indication that the refueling event is complete; and in the second condition, command closed the fuel tank isolation valve to actively terminate the refueling. A second example of the system optionally includes the first example, and further comprises a fuel tank pressure transducer; and wherein the controller further stores instructions in non-transitory memory, that when executed, cause the controller to: monitor actual pressure in the fuel tank during refueling; monitor a fuel fill level in the fuel tank, and indicate a fuel fill level change over a predetermined time period; determine a fuel fill rate, based on the fuel fill level change over the predetermined time and a capacity of the fuel tank; indicate an expected pressure in the fuel tank, the expected pressure a function of the determined fuel fill rate; adjust at least one misfueling pressure threshold, where the at least one misfueling pressure threshold comprises one or more pressure thresholds based at least in part on the fuel fill rate; wherein the at least one misfueling pressure threshold is increased responsive to an increase in the fuel fill rate, and decreased responsive to a decrease in fuel fill rate; and wherein indicating that the incorrect fuel type is being added to the fuel tank during refueling is based on whether the actual pressure in the fuel tank is above or below the at least one misfueling pressure threshold. A third example of the system optionally includes any one or more or each of the first and second examples, and further includes wherein the vehicle comprises a vehicle other than a diesel fuel vehicle; and wherein the controller further stores instructions in non-transitory memory, that when executed, cause the controller to: indicate gasoline or other fuel blend is being added to the fuel tank responsive to the actual pressure in the fuel tank during refueling being above the at least one misfueling pressure threshold in the first condition; and indicate diesel fuel is being added to the fuel tank responsive to the actual pressure in the fuel tank during refueling being below the at least one misfueling pressure threshold in the second condition. A fourth example of the system optionally includes any one or more or each of the first through third examples and further includes wherein the vehicle comprises a non-flexible fuel vehicle; and wherein the controller further stores instructions in non-transitory memory, that when executed, cause the controller to: send a wireless request for information pertaining as to whether a gas station is dispensing high reid vapor pressure fuel; receive a wireless response; and responsive to an indication that the gas station is dispensing high reid vapor pressure fuel: adjust at least two misfueling pressure thresholds, where one misfueling pressure threshold is adjusted based on expected pressure if diesel fuel were being added to the fuel tank, and where another misfueling pressure threshold is adjusted based on expected pressure if high reid vapor pressure fuel were being added to the fuel tank; indicate diesel fuel is being added to the fuel tank responsive to actual pressure in the fuel tank during refueling being below both of the at least two misfueling pressure thresholds in the second condition; indicate E85 or E100 fuel is being added to the fuel tank responsive to actual pressure in the fuel tank during refueling being above the one misfueling pressure threshold, but below the another misfueling pressure threshold in the second condition; and indicate high reid vapor pressure fuel is being added to the fuel tank responsive to actual pressure in the fuel tank during refueling being above both misfueling pressure thresholds in the first condition.

Another example of a method comprises during refueling a fuel tank of a vehicle, monitoring a fuel fill level via a fuel level sensor; calculating a fuel fill rate based on a change in fuel fill level over a predetermined time period and a capacity of the fuel tank; indicating an expected pressure in the fuel tank as a function of the fuel fill rate, where the expected pressure comprises the expected pressure responsive to a correct fuel type being added to the fuel tank; setting at least one misfueling pressure threshold, where the at least one misfueling pressure threshold is a function of the expected pressure; monitoring an actual pressure in the fuel tank during refueling via a fuel tank pressure transducer; indicating misfueling of the vehicle responsive to actual pressure below the at least one misfueling pressure threshold; and responsive to an indication of misfueling, sealing the fuel tank to actively terminate the refueling. In a first example of the method, the method further includes wherein the vehicle is configured to operate via gasoline or other fuel blend that does not include diesel fuel; and wherein indicating misfueling of the vehicle responsive to actual pressure below the at least one misfueling pressure threshold includes addition of diesel fuel to the fuel tank. A second example of the method optionally includes the first example, and further comprises determining that a gas station the vehicle is attempting to refuel at is dispensing high reid vapor pressure fuel; and indicating diesel fuel is being added to the fuel tank responsive to actual pressure in the fuel tank being below both a first misfueling pressure threshold and a second misfueling pressure threshold; indicating E85 or E100 fuel is being added to the fuel tank responsive to actual pressure in the fuel tank above the first misfueling pressure threshold and below the second misfueling pressure threshold; and indicating high reid vapor pressure fuel is being added to the fuel tank responsive to actual pressure in the fuel tank above both the first and second misfueling pressure thresholds; wherein the first pressure threshold is a threshold set based on expected pressure if diesel fuel were being added to the fuel tank, and wherein the second pressure threshold is a threshold set based on expected pressure if high reid vapor pressure fuel were being added to the fuel tank. Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
indicating a presence or an absence of undesired evaporative emissions in a fuel tank and an evaporative emissions system of a vehicle prior to refueling the fuel tank;
during refueling the fuel tank via a refueling dispenser, routing fuel vapors from the fuel tank to a fuel vapor storage canister positioned in the evaporative emissions system that is coupled to the fuel tank; and
responsive to an indication of misfueling,
sealing the fuel tank to actively induce a shutoff of the refueling dispenser, where the indication of misfueling is determined responsive to the absence of undesired evaporative emissions and not under conditions where the presence of undesired evaporative emissions is indicated.

2. The method of claim 1, further comprising:
monitoring an actual pressure in the fuel tank via a fuel tank pressure sensor during refueling;
determining an expected pressure in the fuel tank during refueling;
adjusting at least one misfueling pressure threshold based at least in part on the expected pressure in the fuel tank during refueling; and
indicating misfueling based on whether the actual pressure in the fuel tank is above or below the adjusted misfueling pressure threshold(s);
wherein misfueling includes addition of an incorrect fuel type to the fuel tank.

3. The method of claim 2, further comprising:
monitoring a fuel fill level in the fuel tank during refueling the fuel tank via a fuel level sensor positioned in the fuel tank; and
indicating a dispense rate of fuel into the fuel tank based on a fuel fill level change over a predetermined time period, wherein the dispense rate of fuel is determined via multiplying a capacity of the fuel tank by the fuel fill level change over the predetermined time period;
wherein the expected pressure in the fuel tank during refueling is a function of the dispense rate of fuel into the fuel tank.

4. The method of claim 2, further comprising:
increasing the at least one misfueling pressure threshold responsive to an increase in the expected pressure in the fuel tank during refueling; and
decreasing the at least one misfueling pressure threshold responsive to a decrease in the expected pressure in the fuel tank during refueling.

5. The method of claim 2, wherein the vehicle is configured to run on gasoline or another fuel blend that does not include diesel fuel;
wherein indicating misfueling includes indicating that the actual pressure in the fuel tank is below the adjusted misfueling pressure threshold(s); and
wherein indicating misfueling includes addition of diesel fuel to the fuel tank.

6. The method of claim 2, wherein the vehicle is configured to run on diesel fuel;
wherein indicating misfueling includes indicating that the actual pressure in the fuel tank is above the adjusted misfueling pressure threshold(s); and
wherein indicating misfueling includes addition of gasoline or another fuel blend to the fuel tank.

7. The method of claim 2, further comprising:
determining that fuel being dispensed from the refueling dispenser is high reid vapor pressure fuel;
wherein indicating misfueling includes indicating that the fuel being added to the fuel tank is E85 or E100 responsive to the actual pressure in the fuel tank being below one adjusted misfueling pressure threshold and above another adjusted misfueling pressure threshold;
wherein indicating misfueling includes indicating that the fuel being added to the fuel tank is diesel fuel responsive to the actual pressure in the fuel tank being below both adjusted misfueling pressure thresholds; and
indicating high reid vapor pressure fuel is being added to the fuel tank responsive to the actual pressure in the fuel tank being above both adjusted misfueling pressure thresholds.

8. The method of claim 1, further comprising:
controlling a flow of air and fuel vapor in a vent line coupling the fuel vapor storage canister to atmosphere via a canister vent valve;
wherein sealing the fuel tank to actively induce the shutoff of the refueling dispenser includes commanding closed the canister vent valve.

9. The method of claim 1, further comprising:
controlling a flow of air and fuel vapor in a conduit coupling the fuel tank to the fuel vapor storage canister via a fuel tank isolation valve;
wherein, responsive to the indication of misfueling, the fuel tank isolation valve is commanded closed to seal the fuel tank to actively induce the shutoff of the refueling dispenser.

10. The method of claim 1, further comprising:
reducing pressure in the fuel tank and the evaporative emissions system to a predetermined negative pressure threshold;
sealing the fuel tank and the evaporative emissions system from atmosphere responsive to the pressure in the fuel tank and the evaporative emissions system reaching the predetermined negative pressure threshold; and
indicating the presence of undesired evaporative emissions responsive to a pressure bleedup greater than a predetermined bleedup pressure threshold, or responsive to a pressure bleedup in the fuel tank and the evaporative emissions system changing at a rate greater than a predetermined pressure bleedup threshold rate.

11. The method of claim 1, wherein sealing the fuel tank to actively induce the shutoff of the refueling dispenser prevents fuel from being further added to the fuel tank subsequent to the induced shutoff.

12. A system for a vehicle, comprising:
a fuel tank positioned in a fuel system, the fuel tank coupled to an evaporative emissions system;
a fuel vapor storage canister positioned in the evaporative emissions system;
a canister vent valve positioned in a vent line coupling the fuel vapor storage canister to atmosphere;
a fuel level sensor positioned in the fuel tank; and
a controller storing instructions in non-transitory memory that, when executed, cause the controller to:
responsive to a request for refueling the fuel tank, command open or maintain open the canister vent valve;
in a first condition, including an indication that a correct fuel type is being added to the fuel tank during refueling, maintain the canister vent valve open until an indication that the refueling is complete; and
in a second condition, including an indication that an incorrect fuel type is being added to the fuel tank during refueling, command closed the canister vent valve to actively terminate the refueling.

13. The system of claim 12, further comprising:
a fuel tank isolation valve positioned in a conduit coupling the fuel tank to the fuel vapor canister;
wherein the controller further stores instructions in non-transitory memory that, when executed, cause the controller to:
responsive to the request for refueling, command open or maintain open the fuel tank isolation valve and the canister vent valve;
in the first condition, maintain the fuel tank isolation valve and the canister vent valve open until the indication that the refueling is complete; and
in the second condition, command closed the fuel tank isolation valve to actively terminate the refueling.

14. The system of claim 12, further comprising:
a fuel tank pressure transducer;

wherein the controller further stores instructions in non-transitory memory that, when executed, cause the controller to:
monitor an actual pressure in the fuel tank during refueling;
monitor a fuel fill level in the fuel tank, and indicate a fuel fill level change over a predetermined time period;
determine a fuel fill rate based on the fuel fill level change over the predetermined time and a capacity of the fuel tank;
indicate an expected pressure in the fuel tank, the expected pressure a function of the determined fuel fill rate; and
adjust at least one misfueling pressure threshold, where the at least one misfueling pressure threshold comprises one or more pressure thresholds based at least in part on the determined fuel fill rate;
wherein the at least one misfueling pressure threshold is increased responsive to an increase in the determined fuel fill rate, and decreased responsive to a decrease in the determined fuel fill rate; and
wherein indicating that the incorrect fuel type is being added to the fuel tank during refueling is based on whether the actual pressure in the fuel tank is above or below the at least one misfueling pressure threshold.

15. The system of claim 14, wherein the vehicle comprises a vehicle other than a diesel fuel vehicle; and
wherein the controller further stores instructions in non-transitory memory that, when executed, cause the controller to:
indicate gasoline or another fuel blend is being added to the fuel tank responsive to the actual pressure in the fuel tank during refueling being above the at least one misfueling pressure threshold in the first condition; and
indicate diesel fuel is being added to the fuel tank responsive to the actual pressure in the fuel tank during refueling being below the at least one misfueling pressure threshold in the second condition.

16. The system of claim 14, wherein the vehicle comprises a non-flexible fuel vehicle; and
wherein the controller further stores instructions in non-transitory memory that, when executed, cause the controller to:
send a wireless request for information pertaining as to whether a gas station is dispensing high reid vapor pressure fuel;
receive a wireless response; and
responsive to an indication that the gas station is dispensing high reid vapor pressure fuel:
adjust at least two misfueling pressure thresholds, where one misfueling pressure threshold is adjusted based on an expected pressure if diesel fuel were being added to the fuel tank, and where another misfueling pressure threshold is adjusted based on an expected pressure if high reid vapor pressure fuel were being added to the fuel tank;
indicate diesel fuel is being added to the fuel tank responsive to the actual pressure in the fuel tank during refueling being below both of the at least two misfueling pressure thresholds in the second condition;

indicate E85 or E100 fuel is being added to the fuel tank responsive to the actual pressure in the fuel tank during refueling being above the one misfueling pressure threshold, but below the another misfueling pressure threshold in the second condition; and
indicate high reid vapor pressure fuel is being added to the fuel tank responsive to the actual pressure in the fuel tank during refueling being above both misfueling pressure thresholds in the first condition.

17. A method comprising:
during refueling a fuel tank of a vehicle, monitoring a fuel fill level via a fuel level sensor;
calculating a fuel fill rate based on a change in fuel fill level over a predetermined time period and a capacity of the fuel tank;
indicating an expected pressure in the fuel tank as a function of the fuel fill rate, where the expected pressure in the fuel tank comprises the expected pressure in the fuel tank responsive to a correct fuel type being added to the fuel tank;
setting at least one misfueling pressure threshold, where the at least one misfueling pressure threshold is a function of the expected pressure in the fuel tank;
monitoring an actual pressure in the fuel tank during refueling via a fuel tank pressure transducer;
indicating misfueling of the vehicle responsive to the actual pressure in the fuel tank being below the at least one misfueling pressure threshold; and
responsive to the indication of misfueling, sealing the fuel tank to actively terminate the refueling.

18. The method of claim 17, wherein the vehicle is configured to operate via gasoline or another fuel blend that does not include diesel fuel; and
wherein indicating misfueling of the vehicle responsive to the actual pressure in the fuel tank being below the at least one misfueling pressure threshold includes addition of diesel fuel to the fuel tank.

19. The method of claim 17, wherein the vehicle comprises a non-flexible fuel vehicle, and further comprises:
determining that a gas station the vehicle is attempting to refuel at is dispensing high reid vapor pressure fuel;
indicating diesel fuel is being added to the fuel tank responsive to the actual pressure in the fuel tank being below both a first misfueling pressure threshold and a second misfueling pressure threshold;
indicating E85 or E100 fuel is being added to the fuel tank responsive to the actual pressure in the fuel tank being above the first misfueling pressure threshold and below the second misfueling pressure threshold; and
indicating high reid vapor pressure fuel is being added to the fuel tank responsive to the actual pressure in the fuel tank being above both the first and second misfueling pressure thresholds;
wherein the first pressure threshold is a threshold set based on an expected pressure if diesel fuel were being added to the fuel tank, and wherein the second pressure threshold is a threshold set based on an expected pressure if high reid vapor pressure fuel were being added to the fuel tank.

* * * * *